(12) United States Patent
Sakamoto et al.

(10) Patent No.: US 11,007,607 B2
(45) Date of Patent: May 18, 2021

(54) LASER PROCESSING DEVICE AND LASER PROCESSING METHOD

(71) Applicant: HAMAMATSU PHOTONICS K.K., Hamamatsu (JP)

(72) Inventors: Takeshi Sakamoto, Hamamatsu (JP); Takafumi Ogiwara, Hamamatsu (JP)

(73) Assignee: HAMAMATSU PHOTONICS K.K., Hamamatsu (JP)

( * ) Notice: Subject to any disclaimer, the term of this patent is extended or adjusted under 35 U.S.C. 154(b) by 776 days.

(21) Appl. No.: 15/301,451

(22) PCT Filed: Mar. 30, 2015

(86) PCT No.: PCT/JP2015/059937
§ 371 (c)(1),
(2) Date: Oct. 3, 2016

(87) PCT Pub. No.: WO2015/152156
PCT Pub. Date: Oct. 8, 2015

(65) Prior Publication Data
US 2017/0106476 A1 Apr. 20, 2017

(30) Foreign Application Priority Data

Apr. 4, 2014 (JP) .............................. JP2014-077537

(51) Int. Cl.
*B23K 26/53* (2014.01)
*B23K 26/064* (2014.01)
(Continued)

(52) U.S. Cl.
CPC .............. *B23K 26/53* (2015.10); *B23K 26/03* (2013.01); *B23K 26/064* (2015.10);
(Continued)

(58) Field of Classification Search
CPC .. B23K 26/53; B23K 26/0622; B23K 26/064; B23K 26/082; B23K 26/03; B23K 26/0738; C03B 33/0222; C03B 33/07
(Continued)

(56) References Cited

U.S. PATENT DOCUMENTS 5,624,585 A * 4/1997 Haruta ................... B23K 26/26
219/121.63
6,211,488 B1 * 4/2001 Hoekstra ............ B23K 26/0604
219/121.72

FOREIGN PATENT DOCUMENTS

CN 101772398 7/2010
JP 2007-061855 A 3/2007
(Continued)

OTHER PUBLICATIONS

International Preliminary Report on Patentability dated Oct. 13, 2016 for PCT/JP2015/059937.

*Primary Examiner* — Chee-Chong Lee
(74) *Attorney, Agent, or Firm* — Faegre Drinker Biddle & Reath LLP

(57) ABSTRACT

A laser processing device includes a laser light source, a converging optical system, a controller, and a reflective spatial light modulator. The controller and the reflective spatial light modulator, while using an aberration as a reference aberration, the aberration occurring when laser light is converged at a converging position with an amount of aberration correction in a state in which an ideal converging position is shifted by a predetermined distance to a laser light entrance side from the converging position, adjusts the aberration such that a first converging length longer than a reference converging length of the reference aberration is obtained and a first converging intensity less than a reference converging intensity of the reference aber-
(Continued)

ration is obtained, when a modified region is formed within a first region closest to a front face of an object to be processed.

12 Claims, 28 Drawing Sheets

(51) Int. Cl.
*B23K 26/03* (2006.01)
*B23K 26/082* (2014.01)
*C03B 33/02* (2006.01)
*B23K 26/0622* (2014.01)
*B23K 26/073* (2006.01)
*B23K 101/40* (2006.01)
*B23K 103/00* (2006.01)
*C03B 33/07* (2006.01)

(52) U.S. Cl.
CPC ...... *B23K 26/0622* (2015.10); *B23K 26/0738* (2013.01); *B23K 26/082* (2015.10); *C03B 33/0222* (2013.01); *B23K 2101/40* (2018.08); *B23K 2103/52* (2018.08); *B23K 2103/54* (2018.08); *B23K 2103/56* (2018.08); *C03B 33/07* (2013.01)

(58) Field of Classification Search
USPC .................................................. 219/121.67
See application file for complete search history.

(56) References Cited

FOREIGN PATENT DOCUMENTS

| | | |
|---|---|---|
| JP | 2007-284310 A | 11/2007 |
| JP | 2011-517299 A | 6/2011 |
| JP | 2011-152562 A | 8/2011 |
| JP | 2013-128088 A | 6/2013 |
| WO | WO-2009/114375 A2 | 9/2009 |

\* cited by examiner

Fig.9
(a)
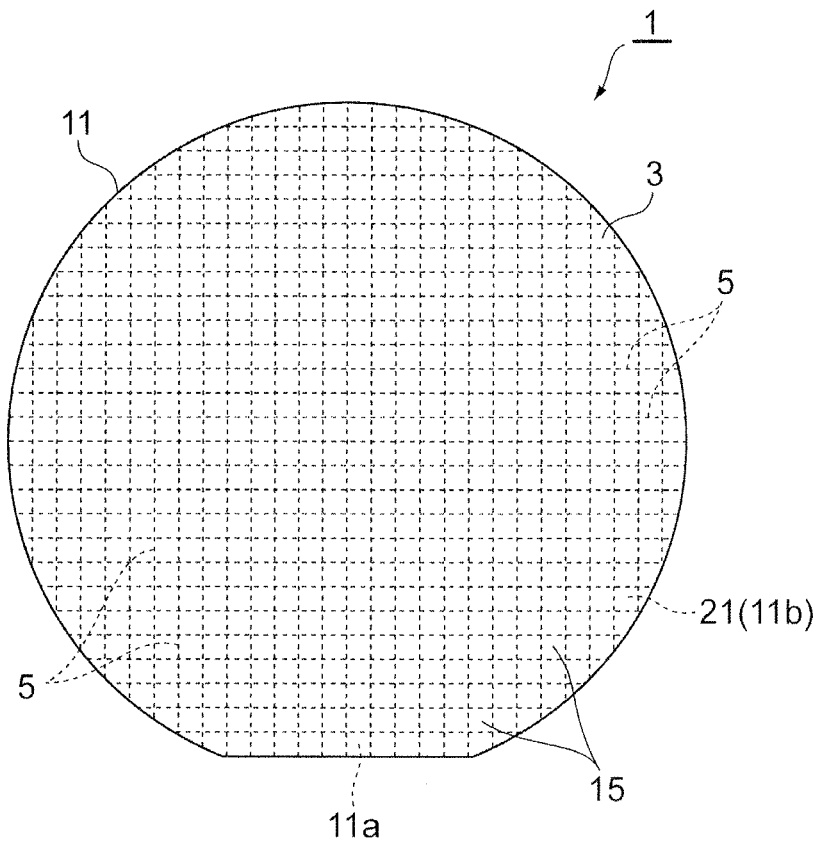
(b)
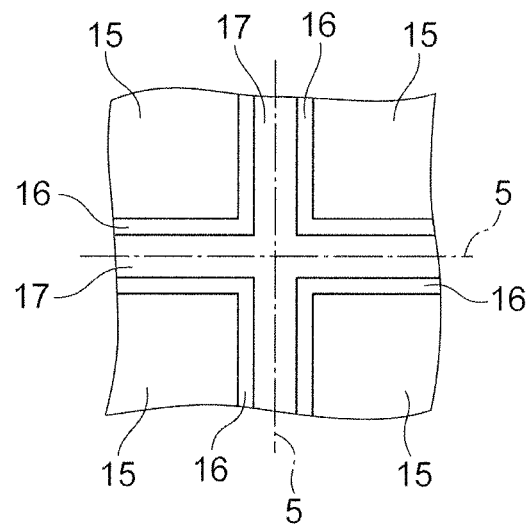

Fig.11
(a)
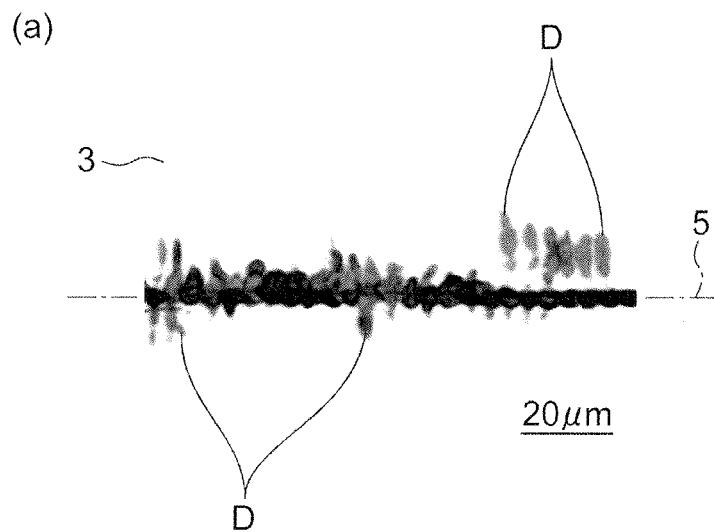
(b)
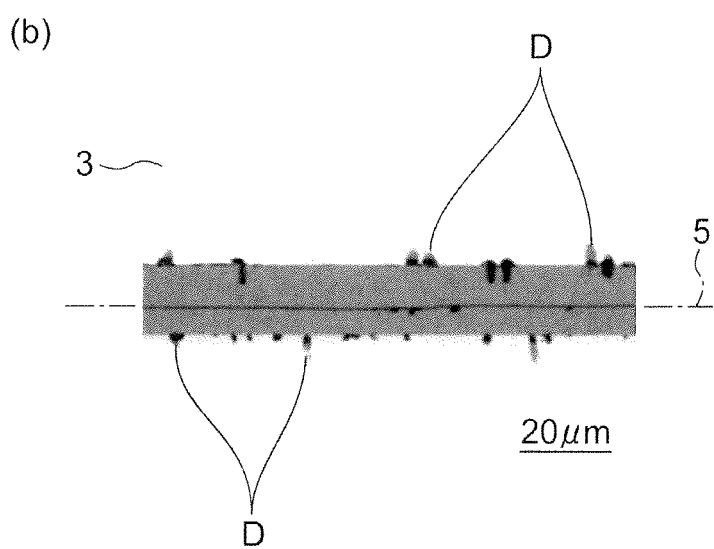

Fig.19

| DISTANCE FROM FRONT FACE TO CONVERGING POSITION | FIRST PROCESSING CONDITION | SECOND PROCESSING CONDITION |
|---|---|---|
| 0 μm | | |
| 20 μm | | |
| 40 μm | | |
| 60 μm | | |

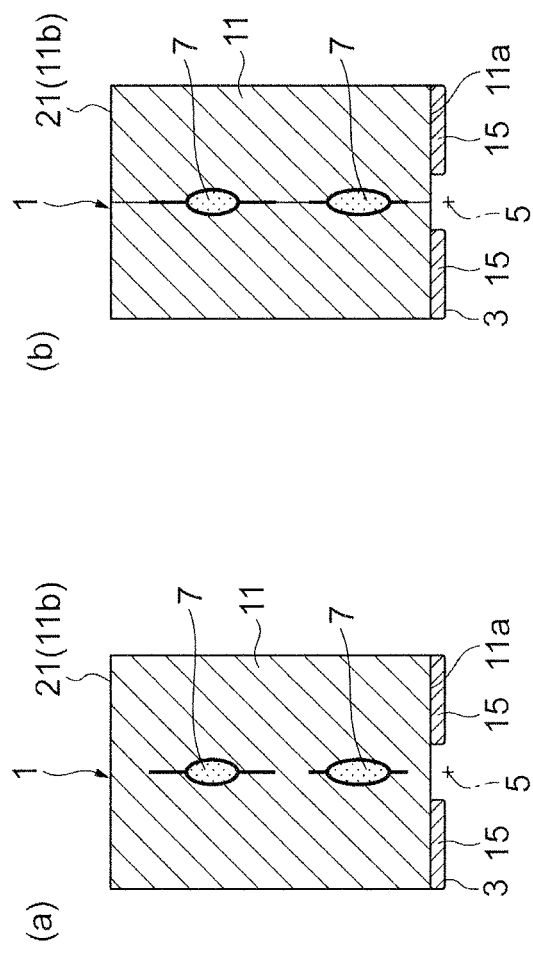

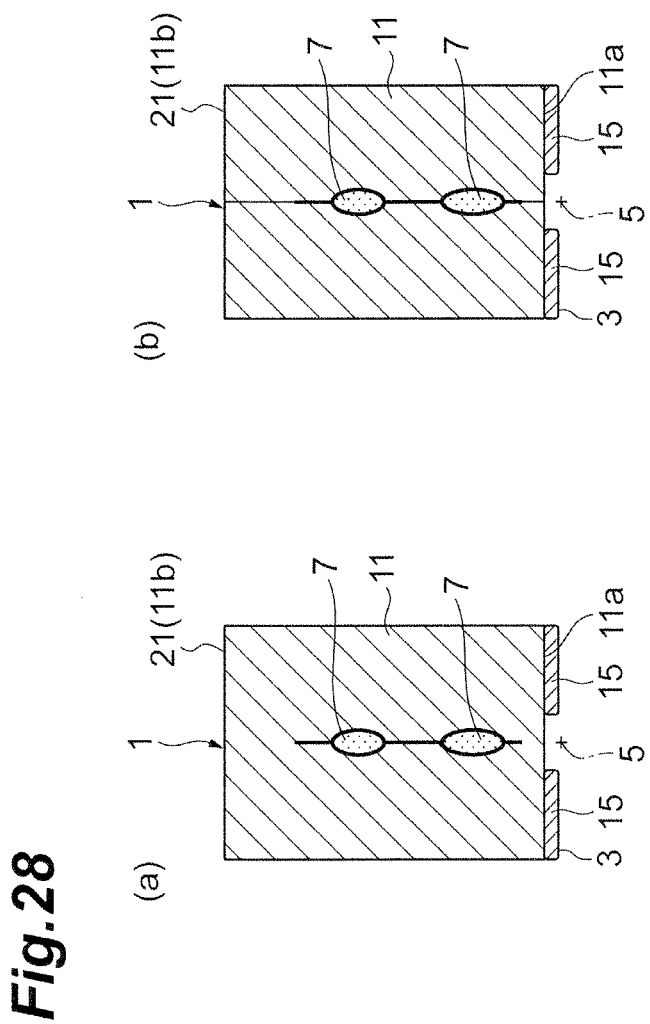

LASER PROCESSING DEVICE AND LASER PROCESSING METHOD

TECHNICAL FIELD

The present invention relates to a laser processing device and a laser processing method capable of converging laser light at an object to be processed so as to form a modified region within the object along a line to cut.

BACKGROUND ART

Known as a conventional laser processing device in the above-mentioned technical field is one which corrects a spherical aberration caused by converging laser light at an object to be processed and occurring at converging positions, and converges the laser light at the object (see, for example, Patent Literature 1).

CITATION LIST

Patent Literature

[Patent Literature 1] Japanese Unexamined Patent Publication No. 2011-152562

SUMMARY OF INVENTION

Technical Problem

Regarding an object to be processed provided with a plurality of functional devices on a surface of the object, there may be a case of setting a line to cut so that the line passes through a region between the functional devices adjacent to each other, and causing the laser light to enter the object from a rear face to form a modified region within the object along the line. However, it has been found that, in such a case, when a spherical aberration occurring at a converging position of the laser light is corrected, there is a possibility that damages occur at a part (for example, wiring included in the functional devices) deviated from the line in a surface as an opposite side to a laser light entrance side of the object.

Therefore, it is an object of the present invention to provide a laser processing device and laser processing method capable of inhibiting damages from occurring at a part deviated from the line in a surface as an opposite side to a laser light entrance side of an object to be processed.

Solution to Problem

The laser processing device of one aspect of the present invention is a laser processing device for converging laser light at an object to be processed so as to form a modified region within the object along a line to cut, the laser processing device including a laser light source emitting the laser light, a converging optical system converging the laser light emitted from the laser light source at the object, and an aberration modulator adjusting an aberration caused by converging the laser light at the object and occurring at a converging position; the aberration modulator, while using the aberration as a reference aberration, the aberration occurring when the laser light is converged at the converging position with an amount of aberration correction in a state in which an ideal converging position is shifted by a predetermined distance to a laser light entrance side along an optical axis of the laser light from the converging position, adjusts the aberration such that a first converging length longer than a reference converging length of the reference aberration is obtained and a first converging intensity less than a reference converging intensity of the reference aberration is obtained, when the modified region is formed within a first region closest to a first surface as an opposite side to the laser light entrance side of the object, and adjusts the aberration such that a second converging length shorter than the reference converging length is obtained and a second converging intensity greater than the reference converging intensity is obtained, when the modified region is formed within a second region closer than the first region in a second surface as the laser light entrance side of the object.

The laser processing method of one aspect of the present invention is a laser processing method for converging laser light at an object to be processed so as to form a modified region within the object along a line to cut, the method including a first step of adjusting an aberration caused by converging the laser light at the object and occurring at a converging position and converging the laser light at the object so as to form the modified region within a first region closest to a first surface as an opposite side to a laser light entrance side of the object, and a second step of adjusting the aberration occurring at the converging position and converging the laser light at the object so as to form the modified region within a second region closer than the first region in a second surface as the laser light entrance side of the object; the first step adjusts the aberration such that a first converging length longer than a reference converging length of a reference aberration is obtained, the reference aberration occurring when the laser light is converged at the converging position with an amount of aberration correction in a state in which an ideal converging position is shifted by a predetermined distance to the laser light entrance side along an optical axis of the laser light from the converging position, and a first converging intensity less than a reference converging intensity of the reference aberration is obtained, and the second step adjusts the aberration such that a second converging length shorter than the reference converging length is obtained and a second converging intensity greater than the reference converging intensity is obtained.

The laser processing device and laser processing method, while using the aberration as the reference aberration, the aberration occurring when the laser light is converged at the converging position with the amount of aberration correction in the state in which the ideal converging position is shifted by the predetermined distance to the laser light entrance side along the optical axis of the laser light from the converging position, adjusts the aberration such that the first converging length longer than the reference converging length of the reference aberration is obtained and the first converging intensity less than the reference converging intensity of the reference aberration is obtained, and converges the laser light at the object so as to form the modified region within the first region closest to the first surface as the opposite side to the laser light entrance side of the object. This can inhibit the damages from occurring at the part deviated from the line in the front face (that is, the first surface) as the opposite side to the laser light entrance side of the object. In the laser processing method of one aspect of the present invention, the second step may be performed after the first step is performed, and the first step may be performed after the second step is performed, and the first step and the second step may be simultaneously performed.

In the laser processing device and laser processing method of one aspect of the present invention, the first surface may be provided with a plurality of functional devices including wiring, and the line may be set to pass through a region between the functional devices adjacent to each other. In this case, the damages can be inhibited from occurring in the wiring included in the functional devices.

In the laser processing device and laser processing method of one aspect of the present invention, the first region may be set to a region in which a distance from the first surface is 60 μm or less. In this case, the damages can be more reliably inhibited from occurring at the part deviated from the line in the first surface, and a fracture extending to a first surface side from the modified region formed within the first region can be caused to reach the first surface along the line accurately.

In the laser processing device and laser processing method of one aspect of the present invention, the second region may be set to a region in which the distance from the first surface is 40 μm or more. In this case, the damages can be more reliably inhibited from occurring at the part deviated from the line in the first surface, and a length can be increased of the fracture extending to the first surface side and second surface side from the modified region formed within the second region.

In the laser processing device and laser processing method of one aspect of the present invention, the predetermined distance may be 110 μm or more and 140 μm or less. In this case, the aberration can be appropriately set as the reference aberration, occurring when the laser light is converged at the converging position with the amount of aberration correction in the state in which the ideal converging position is shifted by the predetermined distance to the laser light entrance side along an optical axis of the laser light from the converging position.

In the laser processing method of one aspect of the present invention, when the second step is performed after the first step is performed, the first region may be set such that a fracture extending to the opposite side to the laser light entrance side does not reach the first surface from the modified region in the first step. In the laser processing method of one aspect of the present invention, when the second step is performed after the first step is performed, the second region may be set so as not to overlap with a fracture extending to the laser light entrance side from the modified region in the first step. In these cases, the damages can be more reliably inhibited from occurring at the part deviated from the line in the first surface when the modified region is formed in the second region.

The laser processing device of one aspect of the present invention is a laser processing device for converging laser light at an object to be processed so as to form a modified region within the object along a line to cut, the laser processing device including a laser light source emitting the laser light, a converging optical system converging the laser light emitted from the laser light source at the object, and an aberration modulator adjusting an aberration caused by converging the laser light at the object and occurring at a converging position; the aberration modulator, while using the aberration as a reference aberration, the aberration occurring when the laser light is converged at the converging position with an amount of aberration correction in a state in which an ideal converging position is shifted by a predetermined distance to a laser light entrance side along an optical axis of the laser light from the converging position, adjusts the aberration such that a first converging length longer than a reference converging length of the reference aberration is obtained and a first converging intensity less than a reference converging intensity of the reference aberration is obtained, when the modified region is formed within a first region in which a distance from a first surface as an opposite side to the laser light entrance side of the object is a predetermined distance or less.

The laser processing method of one aspect of the present invention is a laser processing method for converging laser light at an object to be processed so as to form a modified region within the object along a line to cut, the method including a first step of adjusting an aberration caused by converging the laser light at the object and occurring at a converging position, and converging the laser light at the object so as to form the modified region within a first region in which a distance from a first surface as an opposite side to the laser light entrance side of the object is a predetermined distance or less; the first step adjusts the aberration such that a first converging length longer than a reference converging length of a reference aberration is obtained, the reference aberration occurring when the laser light is converged at the converging position with an amount of aberration correction in a state in which an ideal converging position is shifted by a predetermined distance to the laser light entrance side along an optical axis of the laser light from the converging position, and a first converging intensity less than a reference converging intensity of the reference aberration is obtained.

The laser processing device and laser processing method, while using the aberration as the reference aberration, the aberration occurring when the laser light is converged at the converging position with the amount of aberration correction in the state in which the ideal converging position is shifted by the predetermined distance to the laser light entrance side along the optical axis of the laser light from the converging position, adjusts the aberration such that the first converging length longer than the reference converging length of the reference aberration is obtained and the first converging intensity less than the reference converging intensity of the reference aberration is obtained, and converges the laser light at the object so as to form the modified region within the first region in which the distance from the first surface as the opposite side to the laser light entrance side of the object is the predetermined distance or less. This can inhibit the damages from occurring at the part deviated from the line in the front face (that is, the first surface) as the opposite side to the laser light entrance side of the object.

Advantageous Effects of Invention

According to the present invention, the laser processing device and laser processing method can be provided capable of inhibiting the damages from occurring at the part deviated from the line in the surface as the opposite side to the laser light entrance side of the object.

BRIEF DESCRIPTION OF DRAWINGS

FIG. 9 illustrates (a) a plan view and (b) a partially enlarged plan view of an object to be subjected to a laser processing method of an embodiment of the present invention.

FIG. 11 is a diagram illustrating occurrence of damages in a front face as an opposite side to a laser light entrance side of the object.

FIG. 19 is a diagram illustrating a relationship between processing conditions and converging position of the laser light.

FIG. 27 is a diagram illustrating the formation order of the modified region.

FIG. 28 is a diagram illustrating the formation order of the modified region.

DESCRIPTION OF EMBODIMENTS

Figure 1:
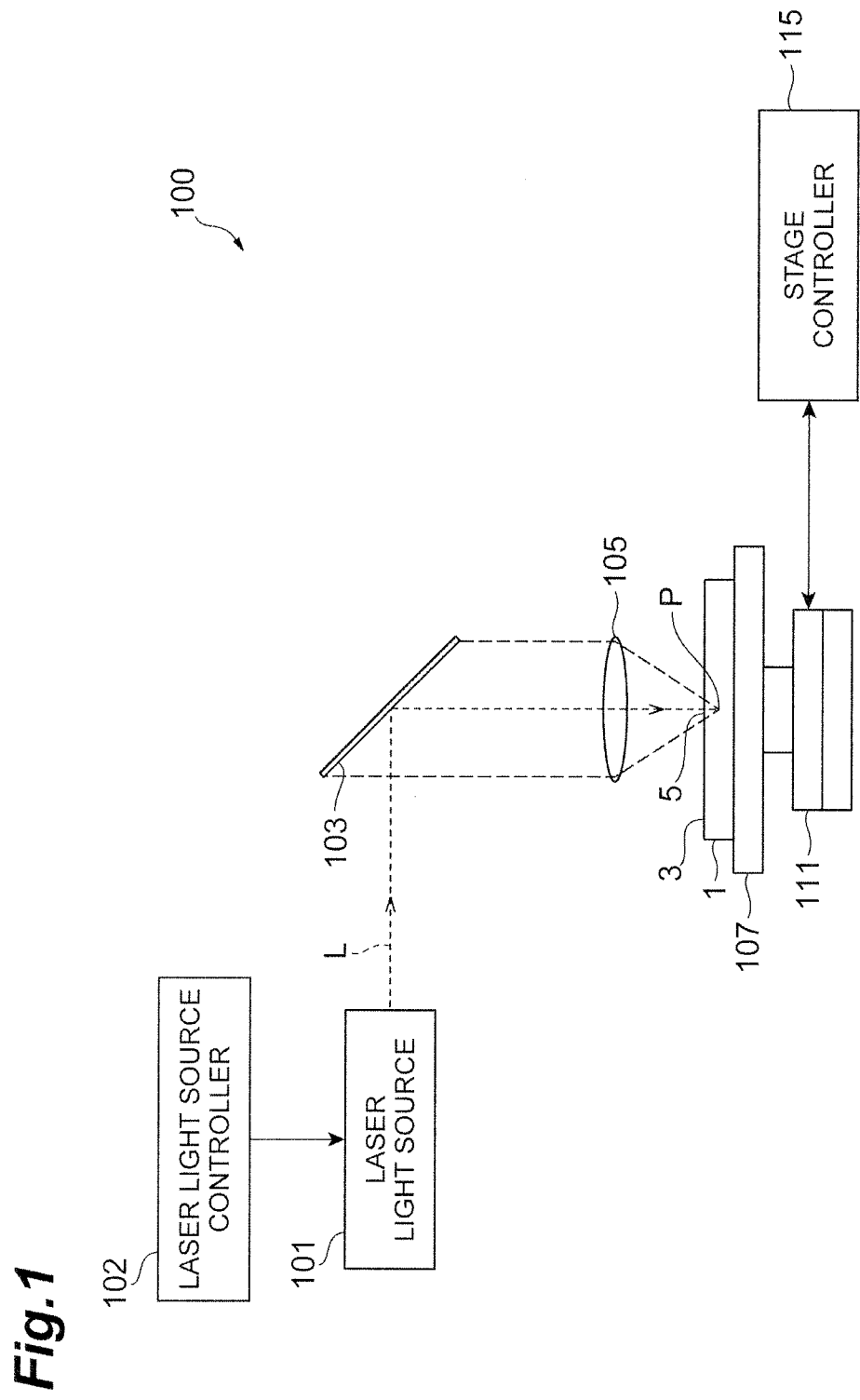
FIG. 1 is a schematic structural diagram of a laser processing device used for forming a modified region.

In the following, embodiments of the present invention will be explained in detail with reference to drawings. In the drawings, the same or equivalent parts will be denoted by the same reference signs, without redundant description.

A laser processing device and laser processing method of an embodiment of the present invention converge laser light at an object to be processed so as to form a modified region within the object along a line to cut. Therefore, the forming of the modified region will be explained at first with reference to FIGS. 1 to 6.

As illustrated in FIG. 1, a laser processing device 100 includes a laser light source 101 for causing laser light L to oscillate in a pulsating manner, a dichroic mirror 103 arranged to change a direction of the optical axis (optical path) of the laser light L by 90°, and a converging lens 105 for converging the laser light L. The laser processing device 100 further includes a support table 107 for supporting an object to be processed 1 which is irradiated with the laser light L converged by the converging lens 105, a stage 111 for moving the support table 107, a laser light source controller 102 for regulating the laser light source 101 in order to adjust the output, pulse width, pulse waveform, and the like of the laser light L, and a stage controller 115 for regulating the movement of the stage 111.

In the laser processing device 100, the laser light L emitted from the laser light source 101 changes the direction of its optical axis by 90° with the dichroic mirror 103 and then is converged by the converging lens 105 into the object 1 mounted on the support table 107. At the same time, the stage 111 is shifted, so that the object 1 moves relative to the laser light L along a line to cut 5. This forms a modified region in the object 1 along the line 5. While the stage 111 is shifted here for relatively moving the laser light L, the converging lens 105 may be shifted instead or together therewith.

Figure 2:
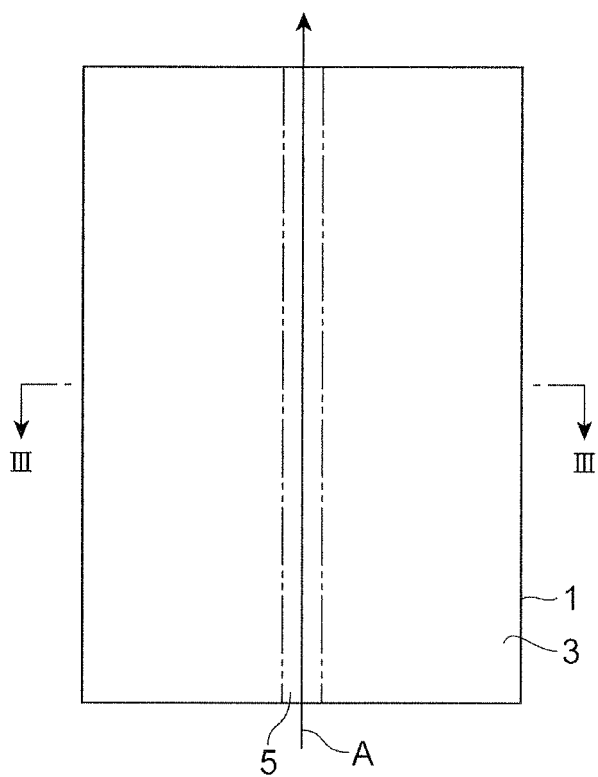
FIG. 2 is a plan view of an object to be processed for which the modified region is formed.
Figure 3:
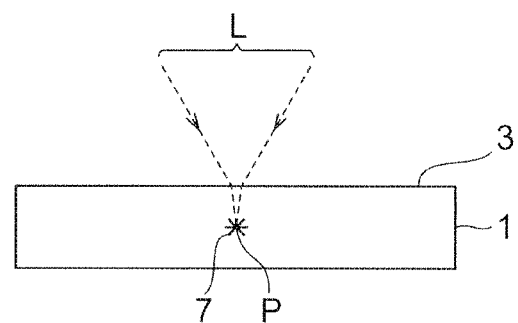
FIG. 3 is a sectional view of the object taken along the line III-III of FIG. 2.
Figure 4:
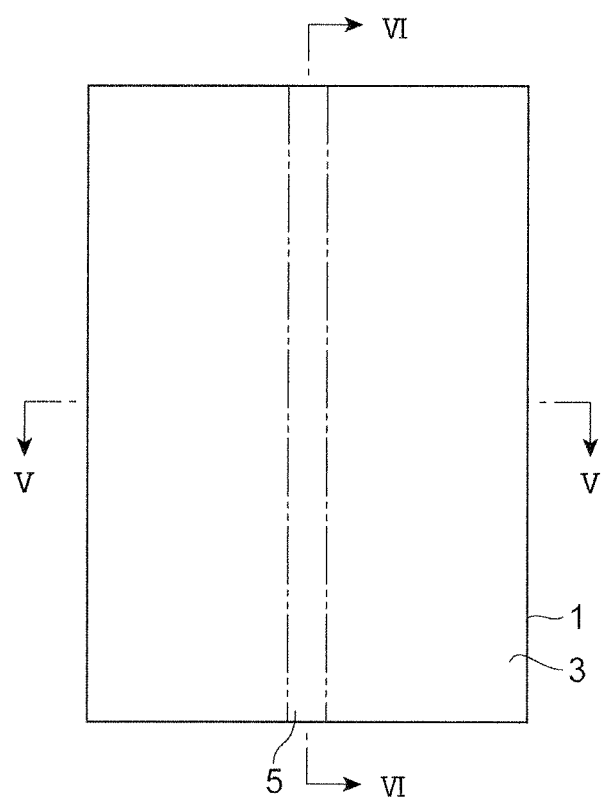
FIG. 4 is a plan view of the object after laser processing.
Figure 5:
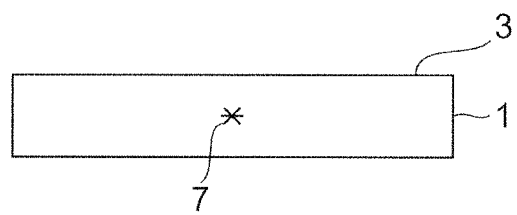
FIG. 5 is a sectional view of the object taken along the line V-V of FIG. 4.
Figure 6:
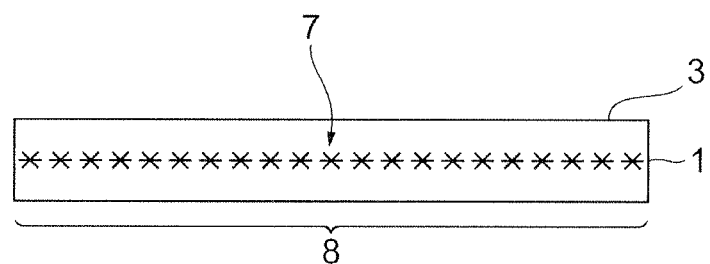
FIG. 6 is a sectional view of the object taken along the line VI-VI of FIG. 4.

Employed as the object 1 is a planar member (e.g., a substrate or a wafer), examples of which include semiconductor substrates formed of semiconductor materials and piezoelectric substrates formed of piezoelectric materials. As illustrated in FIG. 2, in the object 1, the line 5 is set for cutting the object 1. The line 5 is a virtual line extending straight. When forming a modified region within the object 1, the laser light L is relatively moved along the line 5 (i.e., in the direction of arrow A in FIG. 2) while locating a converging point (converging position) P within the object 1 as illustrated in FIG. 3. This forms a modified region 7 within the object 1 along the line 5 as illustrated in FIG. 4, FIG. 5 and FIG. 6, whereby the modified region 7 formed along the line 5 becomes a cutting start region 8.

The converging point P is a position at which the laser light L is converged. The line 5 may be curved instead of being straight, a three-dimensional one combining them, or one specified by coordinates. The line 5 may be one actually drawn on a front face 3 of the object 1 without being restricted to the virtual line. The modified region 7 may be formed either continuously or intermittently. The modified region 7 may be formed either in rows or dots and is only required to be formed at least within the object 1. There are cases where fractures are formed from the modified region 7 acting as a start point, and the fractures and modified region 7 may be exposed at outer surfaces (the front face 3, rear face 21, and outer peripheral surface) of the object 1. The laser light entrance surface for forming the modified region 7 is not limited to the front face 3 of the object 1 but may be the rear face 21 of the object 1.

Here, the laser light L is absorbed in particular in the vicinity of the converging point P within the object 1 while being transmitted therethrough, whereby the modified region 7 is formed in the object 1 (i.e., internal absorption type laser processing). Therefore, the front face 3 of the object 1 hardly absorbs the laser light L and thus does not melt. In the case of forming a removing part such as a hole or groove by melting it away from the front face 3 (surface absorption type laser processing), the processing region gradually progresses from the front face 3 side to the rear face side in general.

By the modified region 7 formed in this embodiment are meant regions of which physical characteristics such as density, refractive index, and mechanical strength have attained states different from those of their surroundings. Examples of the modified region 7 include molten processed regions (meaning at least one of regions resolidified after having being once molten, those in the molten state, and those in the process of resolidifying from the molten state), crack regions, dielectric breakdown regions, refractive index changed regions, and their mixed regions. Other examples of the modified region 7 include areas where the density of the modified region 7 has changed from that of an unmodified region and areas formed with a lattice defect in a material of the object 1 (which may also collectively be referred to as high-density transitional regions).

The molten processed regions, refractive index changed regions, areas where the modified region 7 has a density different from that of the unmodified region, or areas formed with a lattice defect may further incorporate a fracture (cut or microcrack) therewithin or at an interface between the modified region 7 and the unmodified region. The incorporated fracture may be formed over the whole surface of the modified region 7 or in only a part or a plurality of parts thereof. Examples of the object 1 include those containing or made of silicon (Si), glass, silicon carbide (SiC), $LiTaO_3$, and sapphire ($Al_2O_3$).

This embodiment forms a plurality of modified spots (processing scars) along the line 5, thereby producing the modified region 7. The modified spots, each of which is a modified part formed by a shot of one pulse of pulsed laser light (i.e., one pulse of laser irradiation; laser shot), gather to yield the modified region 7. Examples of the modified spots include crack spots, molten processed spots, refractive index changed spots, and those in which at least one of them is mixed. As for the modified spots, their size and lengths of fractures occurring therefrom can be controlled as necessary in view of the required cutting accuracy, the demanded flatness of cut surfaces, the thickness, kind, and crystal orientation of the object 1, and the like.

Figure 7:
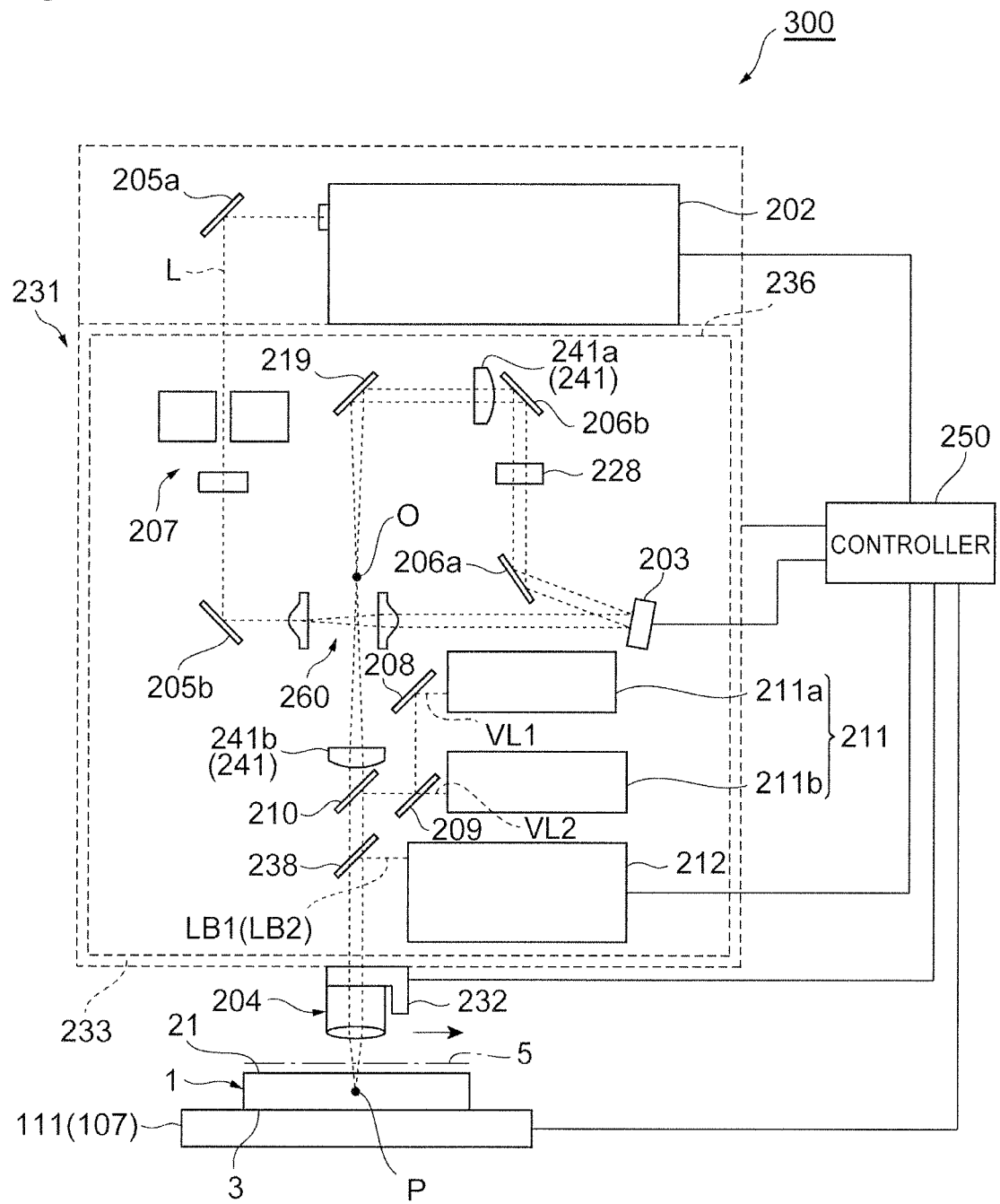
FIG. 7 is a schematic structural diagram of a laser processing device of an embodiment of the present invention.

Next, the laser processing device and laser processing method of the embodiment of the present invention will be explained. As illustrated in FIG. 7, a laser processing device 300 includes a laser light source 202, a reflective spatial light modulator (aberration modulator) 203, a 4f optical system 241, and a converging optical system 204, within a housing 231. The laser processing device 300 converges the laser light L at the object 1 so as to form the modified region 7 within the object 1 along the line 5.

The laser light source 202 emits the laser light L having a wavelength of, for example, from 1000 nm to 1500 nm, and is a fiber laser, for example. Here, the laser light source 202 is secured to a top plate 236 of the housing 231 with a screw and the like so as to emit the laser light L horizontally.

The reflective spatial light modulator 203 modulates the laser light L emitted from the laser light source 202, and is a reflective liquid crystal (liquid crystal on silicon (LCOS)) spatial light modulator (SLM), for example. Here, the reflective spatial light modulator 203 modulates the laser light L horizontally incident thereon, while reflecting it obliquely upward with respect to the horizontal direction.

Figure 8:
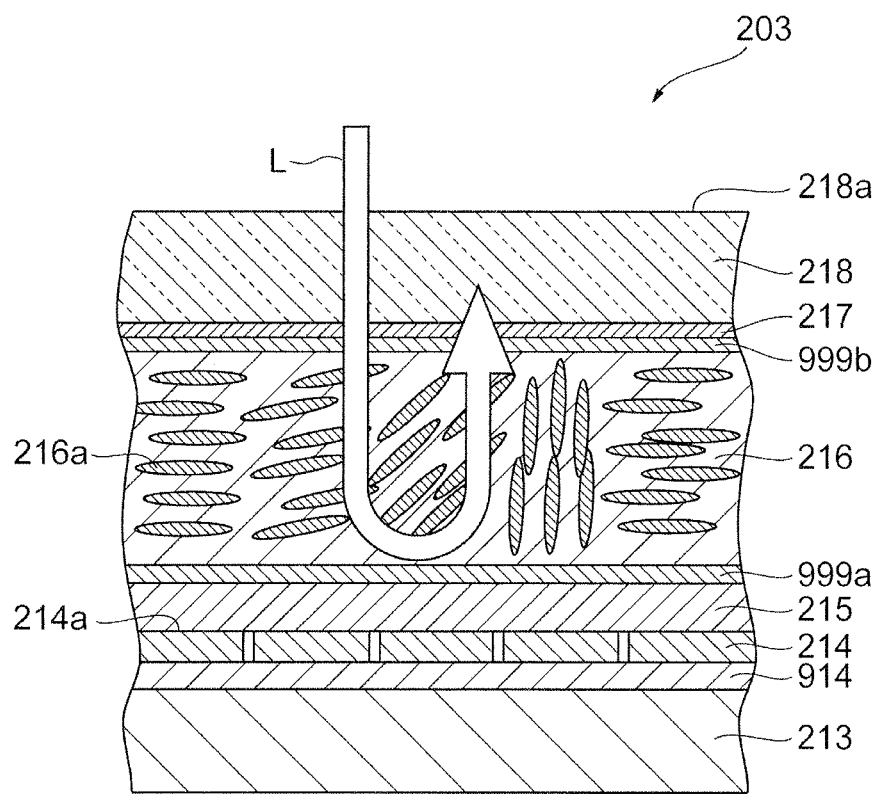
FIG. 8 is a partial sectional view of a reflective spatial light modulator of the laser processing device of FIG. 7.

As illustrated in FIG. 8, the reflective spatial light modulator 203 is constructed by a silicon substrate 213, a drive circuit layer 914, a plurality of pixel electrodes 214, a reflecting film 215 such as a dielectric multilayer mirror, an alignment film 999a, a liquid crystal layer 216, an alignment film 999b, a transparent conductive film 217, and a transparent substrate 218 such as a glass substrate, which are stacked in this order.

The transparent substrate 218 has a front face 218a extending along an XY plane, and the front face 218a constitutes a front face of the reflective spatial light modulator 203. The transparent substrate 218 is made of a light transmitting material such as glass, for example, and transmits therethrough the laser light L having a predetermined wavelength incident thereon from the front face 218a of the reflective spatial light modulator 203 to the inside of the reflective spatial light modulator 203. The transparent conductive film 217 is formed on a rear face of the transparent substrate 218, and includes a conductive material (e.g., ITO) which transmits therethrough the laser light L.

The plurality of pixel electrodes 214 is arranged in a matrix on the silicon substrate 213 along the transparent conductive film 217. Each pixel electrode 214 is made of a metal material such as aluminum, for example, while its front face 214a is processed flat and smooth. The plurality of pixel electrodes 214 are driven by an active matrix circuit provided in the drive circuit layer 914.

The active matrix circuit is provided between the plurality of pixel electrodes 214 and the silicon substrate 213, and controls an applied voltage to the pixel electrodes 214 according to a light image to be output from the reflective spatial light modulator 203. Such active matrix circuit has a first driver circuit for controlling the applied voltage for the pixel rows aligning in the X-axis direction, and a second driver circuit for controlling the applied voltage for pixel rows aligning in the Y-axis direction, which are not illustrated, for example, and is constructed so that a predetermined voltage is applied by the controller 250 (see FIG. 7) to the pixel electrodes 214 of a pixel specified by the driver circuits.

The alignment films 999a, 999b are arranged on both end faces of the liquid crystal layer 216, respectively, so as to align a group of liquid crystal molecules in a fixed direction. The alignment films 999a, 999b are made of a polymer material such as polyimide, of which surfaces coming into contact with the liquid crystal layer 216 are subjected to rubbing, and the like.

The liquid crystal layer 216 is arranged between the plurality of pixel electrodes 214 and the transparent conductive film 217 and modulates the laser light L according to an electric field formed between each pixel electrode 214 and the transparent conductive film 217. That is, when a voltage is applied to the pixel electrodes 214 by the active matrix circuit of the drive circuit layer 914, an electric field is formed between the transparent conductive film 217 and the pixel electrodes 214, and alignment direction of liquid crystal molecules 216a changes according to a magnitude of the electric field formed in the liquid crystal layer 216. When the laser light L enters the liquid crystal layer 216 through the transparent substrate 218 and the transparent conductive film 217, the laser light L is modulated by the liquid crystal molecules 216a while passing through the liquid crystal layer 216, and reflected by the reflecting film 215, and then modulated again by the liquid crystal layer 216, and emitted.

At this time, the voltage applied to the pixel electrodes 214 is controlled by the controller 250 (see FIG. 7), and, according to the voltage, a refractive index changes in a part sandwiched between the transparent conductive film 217 and the pixel electrodes 214 in the liquid crystal layer 216 (the refractive index of the liquid crystal layer 216 changes at positions corresponding to the pixels respectively). The change in the refractive index can alter the phase of the laser light L for each pixel of the liquid crystal layer 216 according to the voltage applied. That is, a phase modulation corresponding to a hologram pattern can be given by the liquid crystal layer 216 for each pixel (i.e., the liquid crystal layer 216 of the reflective spatial light modulator 203 can be caused to display a modulation pattern as a hologram pattern providing a modulation). As a result, the wavefront of the laser light L incident on and transmitted through the modulation pattern is adjusted, so that individual rays constituting the laser light L vary in phases of components in a predetermined direction orthogonal to their advancing direction. Therefore, the laser light L can be modulated (for example, intensity, amplitude, phase, and polarization of the laser light L can be modulated) by setting as necessary the modulation pattern to be displayed in the reflective spatial light modulator 203.

Returning to FIG. 7, the 4f optical system 241 adjusts a wavefront form of the laser light L modulated by the reflective spatial light modulator 203, and has a first lens 241a and a second lens 241b. The lenses 241a, 241b are arranged between the reflective spatial light modulator 203 and the converging optical system 204 so that the distance between the reflective spatial light modulator 203 and the first lens 241a equals a focal length f1 of the first lens 241a, and the distance between the converging optical system 204 and the lens 241b equals a focal length f2 of the lens 241b, and the distance between the first lens 241a and the second lens 241b equals f1+f2, and the first lens 241a and the second lens 241b constitute a double-telecentric optical system. This 4f optical system 241 can inhibit the laser light L modulated by the reflective spatial light modulator 203 from changing its wavefront form through spatial propagation and thereby increasing an aberration.

The converging optical system 204 converges the laser light L emitted from the laser light source 202 and modulated by the reflective spatial light modulator 203, into the object 1. The converging optical system 204, which includes a plurality of lenses, is placed on a bottom plate 233 of the housing 231 while interposing therebetween a drive unit 232 including a piezoelectric device and the like.

In the laser processing device 300 constructed as in the foregoing, the laser light L emitted from the laser light source 202 advances horizontally within the housing 231 and then is reflected downward by a mirror 205a, whereupon its light intensity is adjusted by an attenuator 207. Then, the laser light L is reflected horizontally by a mirror 205b and, with its intensity distribution homogenized by a beam homogenizer 260, enters the reflective spatial light modulator 203.

The laser light L having entered the reflective spatial light modulator 203 passes through the modulation pattern displayed in the liquid crystal layer 216, so as to be modulated according to the modulation pattern, then is reflected upward by a mirror 206a, changes its polarization direction with a half-wave plate 228, and is horizontally reflected by a mirror 206b, so as to enter the 4f optical system 241.

The laser light L having entered the 4f optical system 241 has its wavefront form adjusted so as to be incident as parallel light on the converging optical system 204. Specifically, the laser light L converges by passing through the first lens 241a, is reflected downward by a mirror 219, diverges at a confocal point O, and passes through the second lens 241b, so as to be converged again to become parallel light. Then, the laser light L passes through dichroic mirrors 210, 238 in sequence, so as to enter the converging optical system 204, thereby being converged into the object 1 mounted on the stage 111.

The laser processing device 300 also includes a surface observation unit 211 for observing the laser light entrance surface of the object 1, and an autofocus (AF) unit 212 for finely adjusting the distance between the converging optical system 204 and the object 1, within the housing 231.

The surface observation unit 211 has an observation light source 211a for emitting visible light VL1 and a detector 211b for receiving and detecting reflected light VL2 of the visible light VL1 reflected by the laser light entrance surface of the object 1. In the surface observation unit 211, the visible light VL1 emitted from the observation light source 211a is reflected by or transmitted through a mirror 208 and dichroic mirrors 209, 210, 238, so as to be converged by the converging optical system 204 to the object 1. The reflected light VL2 reflected by the laser light entrance surface of the object 1 is converged by the converging optical system 204, so as to be transmitted through or reflected by the dichroic mirrors 238, 210, and then transmitted through the dichroic mirror 209, so as to be received by the detector 211b.

The AF unit 212 emits AF laser light LB1 and receives and detects reflected light LB2 of the AF laser light LB1 reflected by the laser light entrance surface of the object 1, thereby acquiring displacement data of the laser light entrance surface along the line 5. Then, when forming the modified region 7, the AF unit 212 drives the drive unit 232 according to thus obtained displacement data, so as to move the converging optical system 204 to and fro in its optical axis direction along undulations of the laser light entrance surface of the object 1.

The laser processing device 300 further includes the controller 250 constituted by CPU, ROM, RAM, and the like, for controlling the laser processing device 300. The controller 250 controls the laser light source 202, so as to adjust the output, pulse width, and the like of the laser light L emitted from the laser light source 202. When forming the modified region 7, the controller 250 controls at least one of the positions of the housing 231 and stage 111 and the driving of the drive unit 232 so that the converging point P of the laser light L relatively moves along the line 5 while the converging point P of the laser light L is located at a predetermined distance from the rear face 21 or front face 3 of the object 1.

When forming the modified region 7, the controller 250 applies a predetermined voltage to the pixel electrodes 214 in the reflective spatial light modulator 203, so as to cause the liquid crystal layer 216 to display a predetermined modulation pattern, thereby enabling the reflective spatial light modulator 203 to modulate the laser light L as desired. Here, the modulation pattern displayed in the liquid crystal layer 216 is derived beforehand from the position to be formed with the modified region 7, the wavelength of the laser light L emitted, the material of the object 1, refractive indexes of the converging optical system 204 and object 1, and the like and stored in the controller 250. This modulation pattern includes an individual difference correction pattern for correcting individual differences occurring in the laser processing device 300 (e.g., distortions occurring in the liquid crystal layer 216 of the reflective spatial light modulator 203), a spherical aberration correction pattern for correcting a spherical aberration, and the like. As described above, the controller 250 and the reflective spatial light modulator 203 function as an aberration modulator for adjusting the aberration caused by converging the laser light L at the object 1 and occurring at the converging position.

The object 1 to be subjected to the laser processing method to be performed in the laser processing device 300 constructed as in the foregoing, as illustrated in FIG. 9, includes a substrate 11 made of silicon and the like, a plurality of functional devices 15 formed on a front face 11*a* of the substrate 11, for example. The plurality of functional devices 15 is arranged in a matrix on the front face 11*a* of the substrate 11, and includes wiring 16. As described above, the object 1 is provided with the plurality of functional devices 15 including the wiring 16, on the front face (first surface) 3. Incidentally, the functional devices 15 are light-receiving devices such as photodiodes, light-emitting devices such as laser diodes, circuit devices formed as circuits, or the like.

The laser processing method to be performed in the laser processing device 300 is used as a chip manufacturing method for manufacturing a plurality of chips by cutting the object 1 for each of the functional devices 15. For that reason, in the laser processing method, to the object 1, the plurality of lines 5 is set in a grid so as to pass through a street region (region) 17 between the functional devices 15 adjacent to each other (to pass through the center of the width of the street region 17 when viewed from the thickness direction of the object 1). The laser light L entered from the rear face (second surface) 21 of the object 1, the rear face 21 being a rear face 11*b* of the substrate 11, is converged at the object 1, and the modified region 7 is formed within the object 1 along each of the lines 5.

Figure 10:
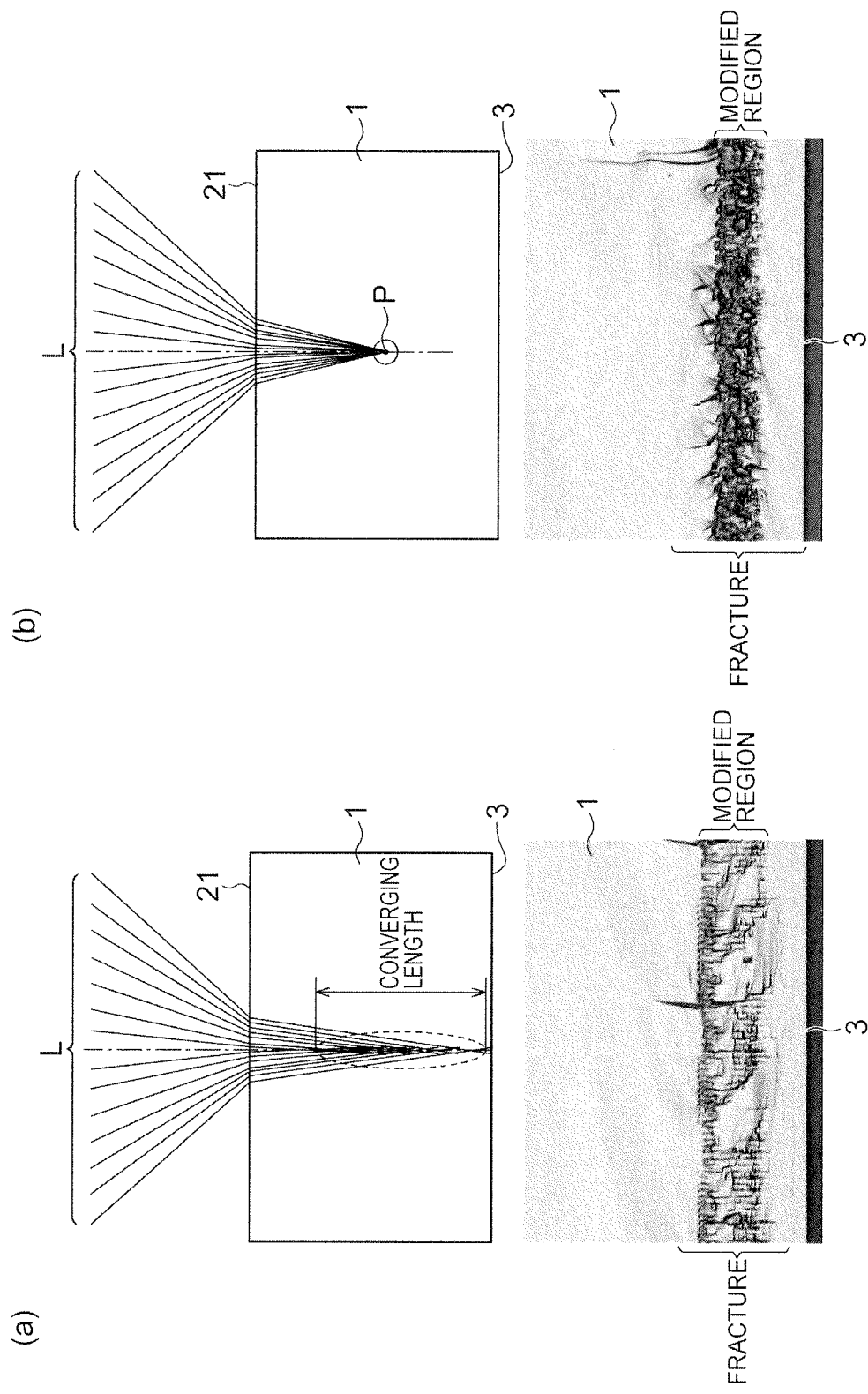
FIG. 10 is a diagram illustrating a relationship between a correction state of an aberration occurring at a converging position of laser light and lengths of fractures extending from the modified region.

In the following, the laser processing method to be performed in the laser processing device 300 will be explained from its background. As illustrated in the upper part of FIG. 10(*a*), when the aberration occurring at the converging position (position at which the modified region is intended to be formed) of the laser light L is not corrected, a converging region (region at which individual rays constituting the laser light L are converged) becomes longer along the optical axis of the laser light L due to the spherical aberration. On the other hand, as illustrated in the upper part of FIG. 10(*b*), when the aberration occurring at the converging position of the laser light L is corrected by using the controller 250 and the reflective spatial light modulator 203, the laser light L is converged at the converging point P. As illustrated in cross-sectional photographs of the object 1 in the lower parts of the FIGS. 10(*a*) and (*b*), the lengths are longer of the fractures extending to a laser light L entrance side and its opposite side from the modified region during formation of the modified region when the aberration is corrected, in comparison with the lengths of when the aberration is not corrected. The fact that the lengths of the fractures are longer is advantageous in shortening the time required for processing since the number of rows can be reduced of the modified region to be formed for one line of the line 5 for cutting the object 1.

However, it has been found that, when the aberration occurring at the converging position of the laser light L is corrected, as illustrated in planar photographs of the object 1 of FIGS. 11(*a*) and (*b*), damages D may occur at the part deviated from the line 5 in the front face 3 as the opposite side to the laser light L entrance side of the object 1. Experimental conditions are as follows of when the planar photographs of the object 1 of FIGS. 11(*a*) and (*b*) are obtained.

1. Object to be Processed
   (1) An Au film of thickness of 300 Å is formed on the front face of a silicon substrate of a thickness of 250 µm, and a crystal orientation of (100).
   (2) In (a), the Au film is formed to cover the line 5; in (b), the Au film is formed to form the street region of a width of 15 µm along the line 5.
2. Laser Light Irradiation Conditions
   (1) While using the rear face of the silicon substrate as a laser light entrance surface, the converging point of the laser light is adjusted at the front face of the silicon substrate (that is, in the vicinity of an interface between the silicon substrate and the Au film), and the laser light L is emitted under the conditions of a wavelength of 1080 nm, repetition frequency of 80 kHz, pulse width of 500 ns, exit output of 1.2 W, and scan speed (relative movement speed of the converging point along the line 5) of 300 mm/s.

Figure 12:
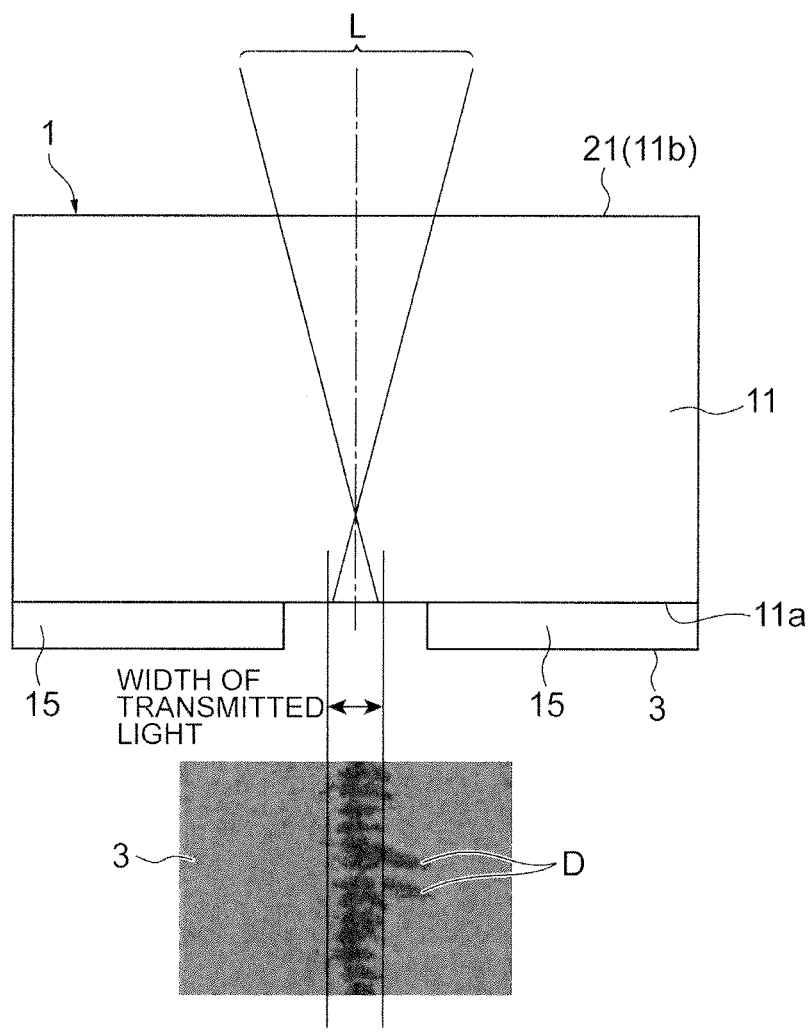
FIG. 12 is a diagram illustrating a relationship between a width of transmitted light of the laser light and occurrence positions of the damages.

Causes of such damages D are examined. First, as illustrated in FIG. 12, the damages D occur at a region beyond the width of transmitted light of the laser light L (a region outside the width of the transmitted light). From this, the transmitted light of the laser light L is not considered as the cause of the damages D. Incidentally, the lower part of FIG. 12 is a planar photograph of the object 1.

Figure 13:
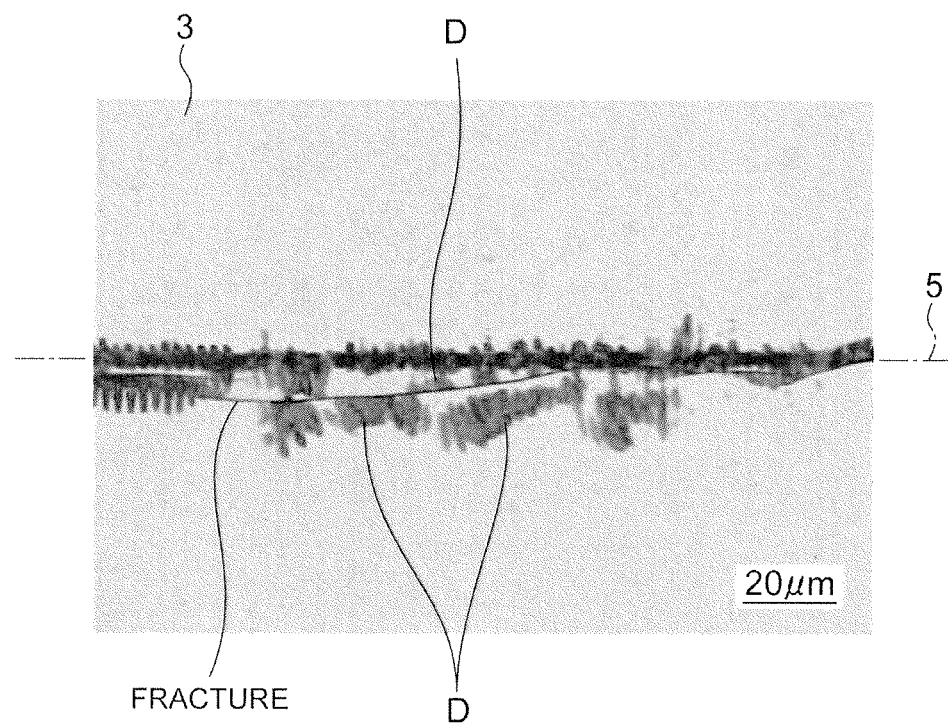
FIG. 13 is a diagram illustrating that occurrence of the damages in the front face as the opposite side to the laser light entrance side of the object.

As illustrated in a planar photograph of the object 1 of FIG. 13, more damages D occur when a fracture extending from the modified region during formation of the modified region reach the front face 3 of the object 1. Moreover, when the fracture meanders in the front face 3 of the object 1, the damages D occur along the meandering of the fracture. From these, the fracture extending from the modified region is considered as one of the causes of the damages D. Experimental conditions are as follows of when the planar photograph of the object 1 of FIG. 13 is obtained.

1. Object to be Processed
   (1) An Au film of a thickness of 300 Å is formed on the front face of a silicon substrate of a thickness of 250 µm, a crystal orientation of (100), and a resistance value of 1 Ω·cm.
   (2) The Au film is formed to cover the line 5.
2. Laser Light Irradiation Conditions
   (1) While using the rear face of the silicon substrate as a laser light entrance surface, the converging point of the laser light is adjusted at the front face of the silicon substrate (that is, in the vicinity of an interface between the silicon substrate and the Au film), and the laser light L is emitted under the conditions of a wavelength of 1342 nm, repetition frequency of 90 kHz, pulse width of 90 ns, exit output of 1.27 W, and scan speed of 340 mm/s.

Figure 14:
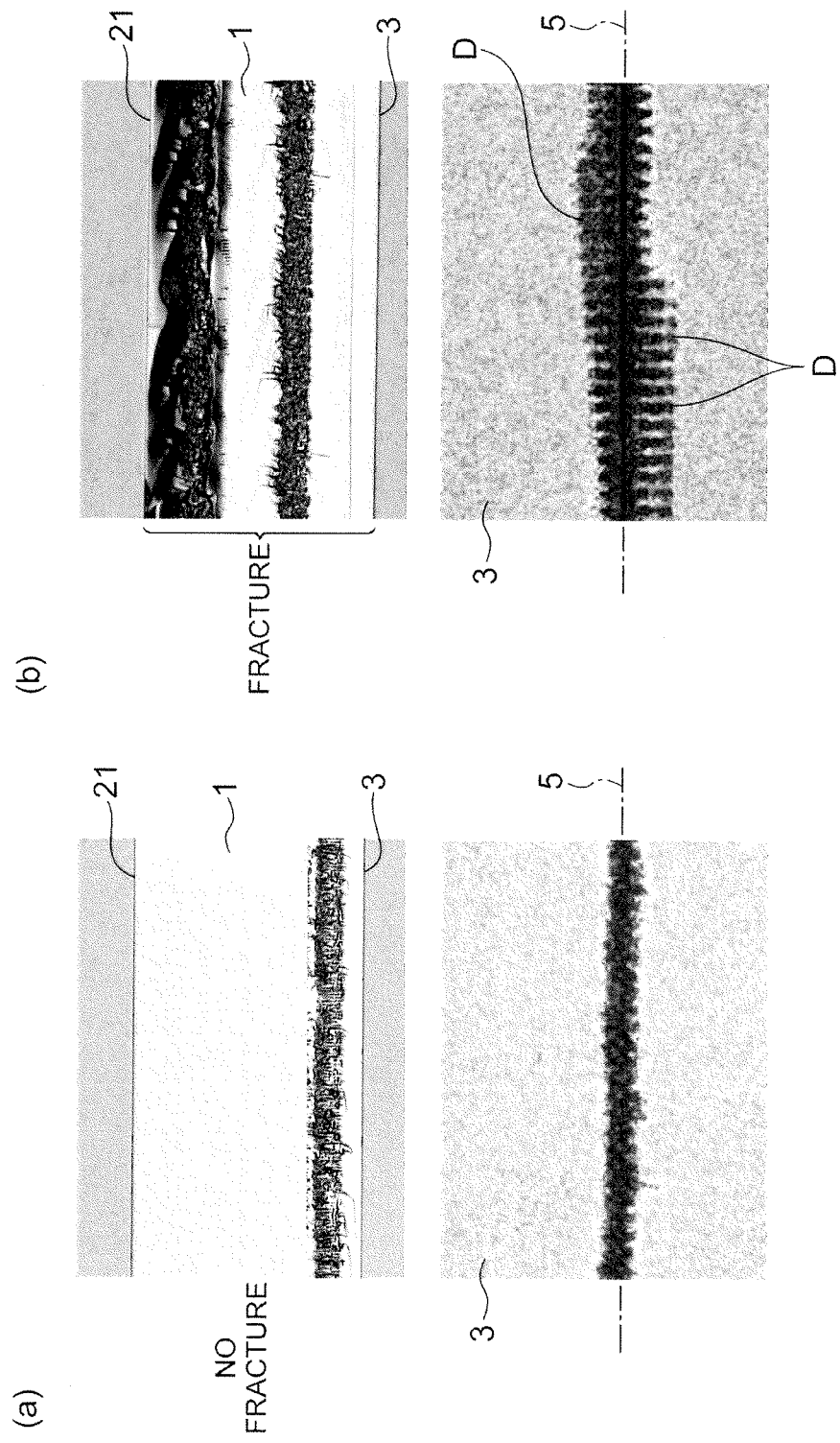
FIG. 14 is a diagram illustrating a relationship between presence of fractures formed beforehand in the object and an amount of occurrence of the damages.

Further, as illustrated in cross-sectional photographs of the object 1 of the upper parts of FIGS. 14(*a*) and (*b*), an object 1 in which the fracture is not formed beforehand along the line 5 and an object 1. In which the fracture is formed beforehand along the line 5 are prepared, and the laser light L is emitted to each object 1 along the line 5 without correcting the aberration occurring at the converging position of the laser light L. As a result, as illustrated in planar photographs of the object 1 of the lower parts of FIGS. 14(*a*) and (*b*), more damages D occur when the fracture is formed beforehand in the object 1 than when the fracture is not formed beforehand in the object 1.

From the above, the causes of the damages D include the following 1-3.
1. When one row of a modified region is formed along one line of the line 5 and then another one row of a modified region is formed along the one line of a line 5, when the converging position of the laser light L overlaps with an already formed one row of the modified region or a fracture extending from the modified region, the already formed one row of the modified region or the fracture extending from the modified region functions as a mirror surface during the laser light L irradiation, and part of the laser light L causes reflection, interference, diffraction, scattering, and the like, and the part of the laser light L is emitted to a region beyond the width of the transmitted light of the laser light L; as a result, the part of the laser light L is absorbed by the wiring 16 of the functional devices 15 and the like, and melting occurs in the wiring 16 and the like.

2. When the converging position of current one pulse laser irradiation overlaps with a modified region formed by previous one pulse laser irradiation or a fracture extending from the modified region, the modified region formed by the previous one pulse laser irradiation or the fracture extending from the modified region functions as a mirror surface during the current one pulse laser irradiation, and part of the laser light L of the current one pulse laser irradiation causes reflection, interference, diffraction, scattering, and the like, and the part of the laser light L is emitted to a region beyond the width of the transmitted light of the laser light L; as a result, the part of the laser light L is absorbed by the wiring 16 of the functional devices 15 and the like, and melting occurs in the wiring 16 and the like.

3. When the current one pulse laser irradiation is performed so that, in a state in which a fracture extending from the modified region formed by the previous one pulse laser irradiation reaches the rear face 21 or front face 3 of the object 1, the converging position overlaps with the fracture, the fracture reaching the rear face 21 or front face 3 of the object 1 by the previous one pulse laser irradiation functions as a mirror surface during the current one pulse laser irradiation, and part of the laser light L of the current one pulse laser irradiation causes reflection, interference, diffraction, scattering, and the like, and the part of the laser light L is emitted to a region beyond the width of the transmitted light of the laser light L; as a result, the part of the laser light L is absorbed by the wiring 16 of the functional devices 15, and the like, and melting occurs in the wiring 16 and the like.

Figure 15:
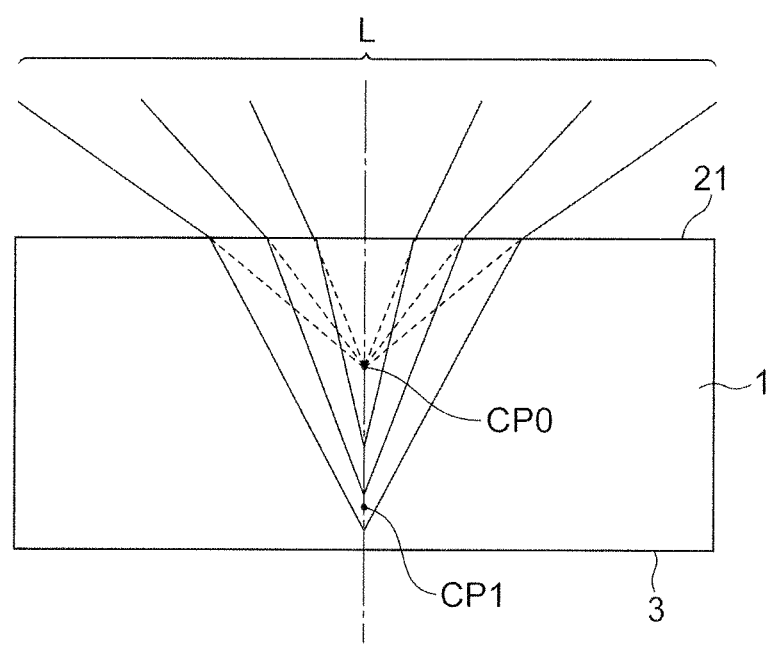
FIG. 15 is a diagram illustrating a relationship between an ideal converging position and converging position of the laser light.

Therefore, in the laser processing method performed in the laser processing device 300, as illustrated in FIG. 15, an aberration is determined as a reference aberration, the aberration occurring when the laser light L is converged at a converging position CP1 in a state in which aberration correction is performed so that the laser light L is ideally converged at a position CP0 shifted by a predetermined distance to the laser light L entrance side along the optical axis of the laser light L from the converging position CP1 (In this case, CP0 is an ideal converging position). That is, an aberration is determined as the reference aberration, the aberration occurring when the laser light L is converged at the converging position CP1 with an amount of aberration correction in a state in which the ideal converging position CP0 is shifted by the predetermined distance to the laser light L entrance side along the optical axis of the laser light L from the converging position CP1. The reference aberration is set in the controller 250. Incidentally, the converging position CP1 is a position at which the modified region is intended to be formed, and, for example, corresponds to an edge position of the opposite side to the laser light L entrance side of the modified region intended to be formed.

The ideal converging position CP0 is a position of a converging point of the laser light L ideally converged (that is, a converging state in which an aberration is reduced until the state is close to a converging state of when it is assumed that there is no medium).

The laser processing method performed in the laser processing device 300, when forming a modified region within a first region closest to the front face 3 as the opposite side to the laser light L entrance side of the object 1, adjusts the aberration occurring at the converging position CP1 such that a first converging length longer than a reference converging length of the reference aberration is obtained and a first converging intensity less than a reference converging intensity of the reference aberration is obtained. The laser processing method, when forming a modified region within a second region closer than the first region in the rear face 21 as the laser light L entrance side of the object 1, adjusts the aberration occurring at the converging position CP1 such that a second converging length shorter than the reference converging length of the reference aberration is obtained and a second converging intensity greater than the reference converging intensity of the reference aberration is obtained. These adjustments of the aberration are performed by the controller 250 and the reflective spatial light modulator 203. Incidentally, the converging length is a length of a converging region (region at which individual rays constituting the laser light L are converged) along the optical axis of the laser light L. The converging intensity is an intensity of the laser light per unit area in the converging region.

The above-mentioned reference aberration is examined with an experiment. Experimental conditions are as follows.
1. Object to be Processed
  (1) A silicon substrate is prepared of a thickness of 250 μm, a crystal orientation (100), and a resistance value of 1 Ω·cm.
2. Laser Light Irradiation Conditions
  (1) The ideal converging position CP0 and the converging position CP1 of the laser light L are adjusted under the conditions of the Table 1 below, and the laser light L is emitted under the conditions of a wavelength of 1080 nm, repetition frequency of 80 kHz, pulse width of 500 ns, exit output of 12 W, and scan speed of 300 mm/s. Incidentally, in Table 1, the "front face" is the front face 3 as the opposite side to the laser light L entrance side of the object 1, and the "rear face" is the rear face 21 as the laser light L entrance side of the object 1. The "amount of shift" is a distance from the converging position (that is, a position at which the laser light is desired to be converged to form the modified region) to the ideal converging position (that is, a converging position at which the laser light is ideally converged with the aberration correction), and, with reference to the converging position CP1, when the ideal converging position CP0 is shifted to the laser light L entrance side, the amount of shift is represented by a "−" value, and when the ideal converging position CP0 is shifted to the opposite side to the laser light L entrance side, the amount of shift is represented by a "+" value.

TABLE 1

| No. | Distance from Rear Face to Converging Position (μm) | Distance from Front Face to Converging Position (μm) | Distance from Rear Face to Ideal Converging Position (μm) | Amount of Shift (μm) |
|---|---|---|---|---|
| 1 | 230 | 20 | 58 | −172 |
| 2 | 230 | 20 | 90 | −140 |

TABLE 1-continued

| No. | Distance from Rear Face to Converging Position (μm) | Distance from Front Face to Converging Position (μm) | Distance from Rear Face to Ideal Converging Position (μm) | Amount of Shift (μm) |
|---|---|---|---|---|
| 3 | 230 | 20 | 120 | −110 |
| 4 | 230 | 20 | 158 | −72 |
| 5 | 230 | 20 | 197 | −33 |
| 6 | 230 | 20 | 235 | +5 |

Figure 16:
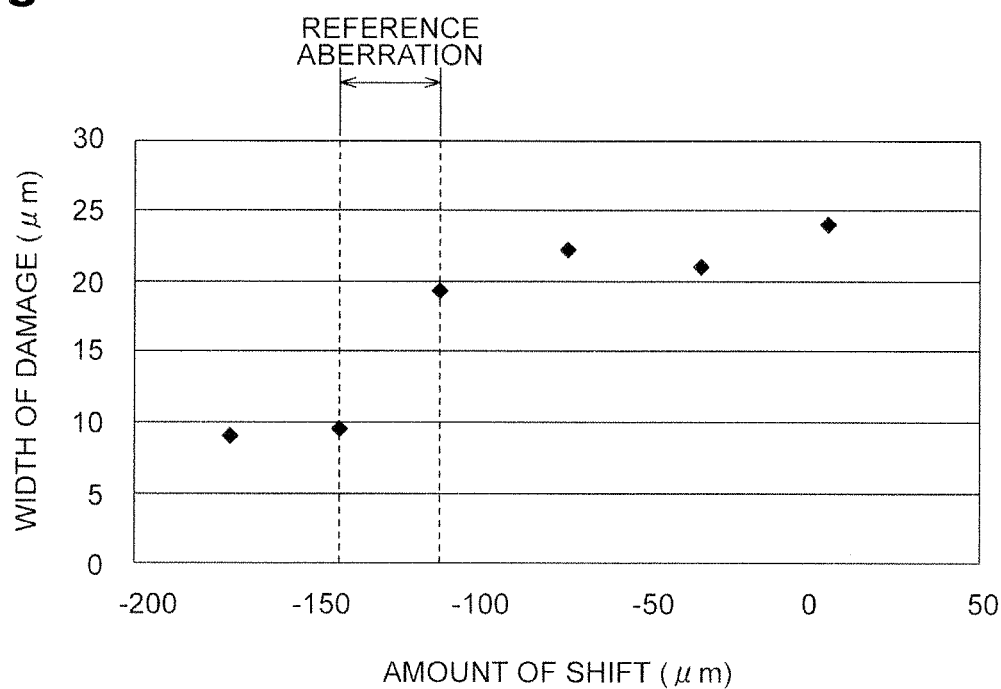
FIG. 16 is a diagram illustrating a relationship between a width of the damage and amount of shift of the laser light.
Figure 17:
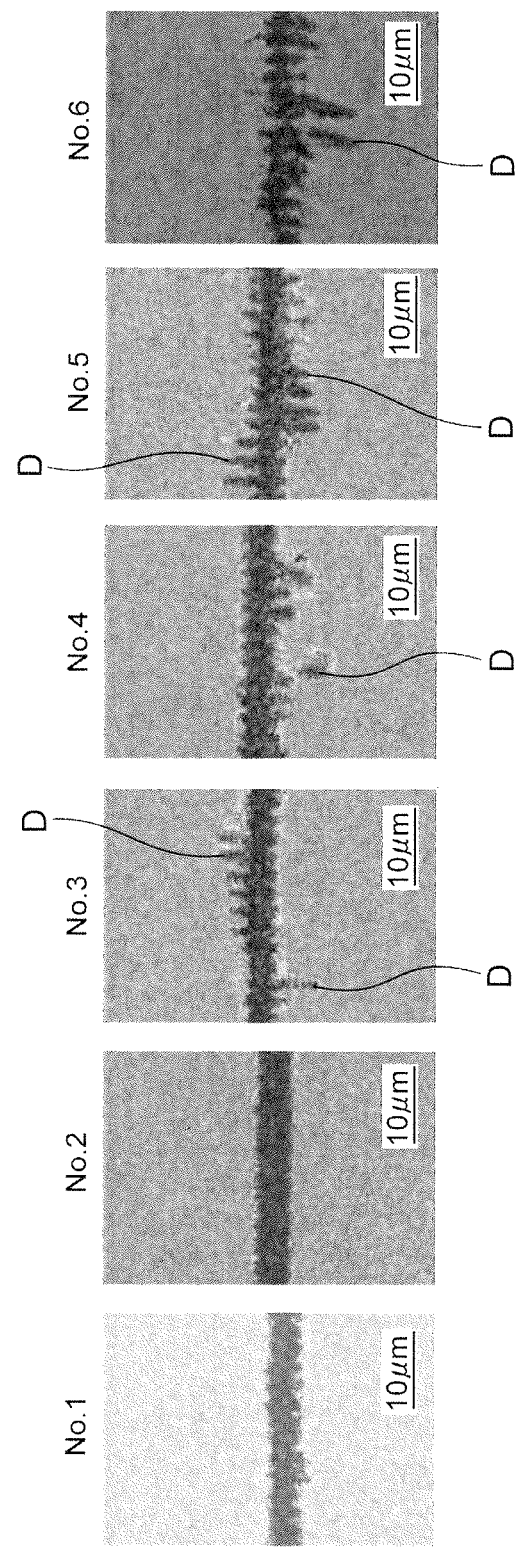
FIG. 17 is a diagram illustrating the relationship between the width of the damage and amount of shift of the laser light.

As a result of this experiment, it has been found that, as illustrated in FIG. 16 and FIG. 17, in a case in which the ideal converging position CP0 is shifted to the laser light L entrance side, when the absolute value of the amount of shift is less than 110 μm, the width of the damages D increases, and when the absolute value of the amount of shift is greater than 140 μm, the width of the damages D decreases. Incidentally, FIG. 17 illustrates planar photographs of the object 1, and the photographs are results of the cases of No. 1-No. 6 of Table 1, respectively.

Therefore, in this case, an aberration can be determined as the reference aberration in which the absolute value of the amount of shift is 110 μm or more and 140 μm or less in a state in which the ideal converging position. CP0 is shifted to the laser light L entrance side along the optical axis of the laser light L from the converging position CP1. When forming the modified region within the first region closest to the front face 3 as the opposite side to the laser light L entrance side of the object 1, the laser processing method can adjust the aberration occurring at the converging position. CP1 such that the first converging length longer than the reference converging length of the reference aberration is obtained and the first converging intensity less than the reference converging intensity of the reference aberration is obtained. When forming the modified region within the second region closer than the first region in the rear face 21 as the laser light L entrance side of the object 1, the laser processing method can adjust the aberration occurring at the converging position CP1 such that the second converging length shorter than the reference converging length of the reference aberration is obtained and the second converging intensity greater than the reference converging intensity of the reference aberration is obtained.

Figure 18:
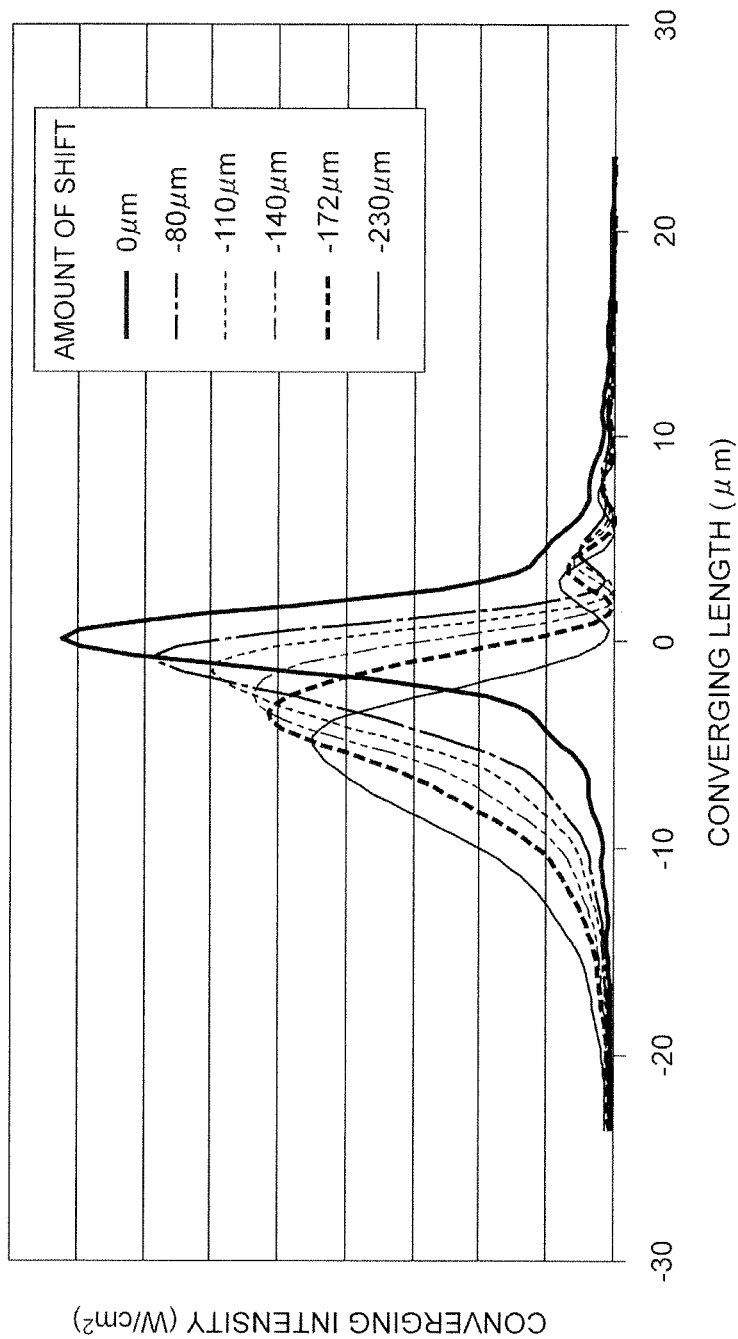
FIG. 18 is a diagram illustrating a relationship between a converging intensity and converging length of the laser light.

As illustrated in FIG. 18, in the state in which the ideal converging position CP0 is shifted to the laser light L entrance side along the optical axis of the laser light L from the converging position CP1, a converging length of the laser light L is longer as the absolute value of the amount of shift increases, and a converging intensity of the laser light L is less as the absolute value of the amount of shift increases. From this, when forming the modified region within the first region closest to the front face 3 as the opposite side to the laser light L entrance side of the object 1, it can also be said that the laser processing method can adjust the aberration occurring at the converging position CP1 such that a first amount of shift longer than a reference amount of shift of the reference aberration is obtained. When forming the modified region within the second region closer than the first region in the rear face 21 as the laser light L entrance side of the object 1, it can be said that the laser processing method can adjust the aberration occurring at the converging position CP1 such that a second amount of shift shorter than the reference amount of shift of the reference aberration is obtained.

Next, the above-mentioned first region and second region are examined with an experiment. Experimental conditions are as follows.

1. Object to be Processed
   (1) A silicon substrate is prepared of a thickness of 250 μm, a crystal orientation (100), and a resistance value of 1 Ω·cm.
2. Laser Light Irradiation Conditions
   (1) The ideal converging position CP0 and the converging position CP1 of the laser light L are adjusted under the conditions indicated in FIG. 19, and the laser light L is emitted under the conditions of a wavelength of 1080 nm, repetition frequency of 80 kHz, pulse width of 500 ns, exit output of 1.2 W, and scan speed of 300 mm/s. Incidentally, in FIG. 19, the "front face" is the front face 3 as the opposite side to the laser light L entrance side of the object 1. The "first processing condition" is a condition in which the laser processing method adjusts the aberration occurring at the converging position CP1 such that the first converging length longer than the reference converging length of the reference aberration is obtained and the first converging intensity less than the reference converging intensity of the reference aberration is obtained, and the "second processing condition" is a condition in which the laser processing method adjusts the aberration occurring at the converging position CP1 such that the second converging length shorter than the reference converging length of the reference aberration is obtained and the second converging intensity greater than the reference converging intensity of the reference aberration is obtained.

As a result of this experiment, as illustrated in FIG. 19, under the second processing condition, when a distance from the front face 3 of the object 1 to the converging position CP1 is 0 μm and when the distance is 20 μm, the damages D (that is, damages occurring at the part deviated from the line 5 in the front face 3 of the object 1) occur, and when the distance from the front face 3 of the object 1 to the converging position CP1 is 60 μm, the damages D do not occur. Under the first processing condition, the damages D do not occur in both cases. Incidentally, FIG. 19 illustrates planar photographs of the object 1.

Therefore, when forming the modified region within the first region closest to the front face 3 as the opposite side to the laser light L entrance side of the object 1, the laser processing method can adopt the first processing condition (that is, a condition in which the laser processing method adjusts the aberration occurring at the converging position CP1 such that the first converging length longer than the reference converging length of the reference aberration is obtained and the first converging intensity less than the reference converging intensity of the reference aberration is obtained), and set the first region to a region in which a distance from the front face 3 of the object 1 is 60 μm or less. When forming the modified region within the second region closer than the first region in the rear face 21 as the laser light L entrance side of the object 1, the laser processing method can adopt the second processing condition (that is, the condition in which the laser processing method adjusts the aberration occurring at the converging position CP1 such that the second converging length shorter than the reference converging length of the reference aberration is obtained and the second converging intensity greater than the reference converging intensity of the reference aberration is obtained), and set the second region to a region in which the distance from the front face 3 of the object 1 is 40 μm or more.

Figure 20:
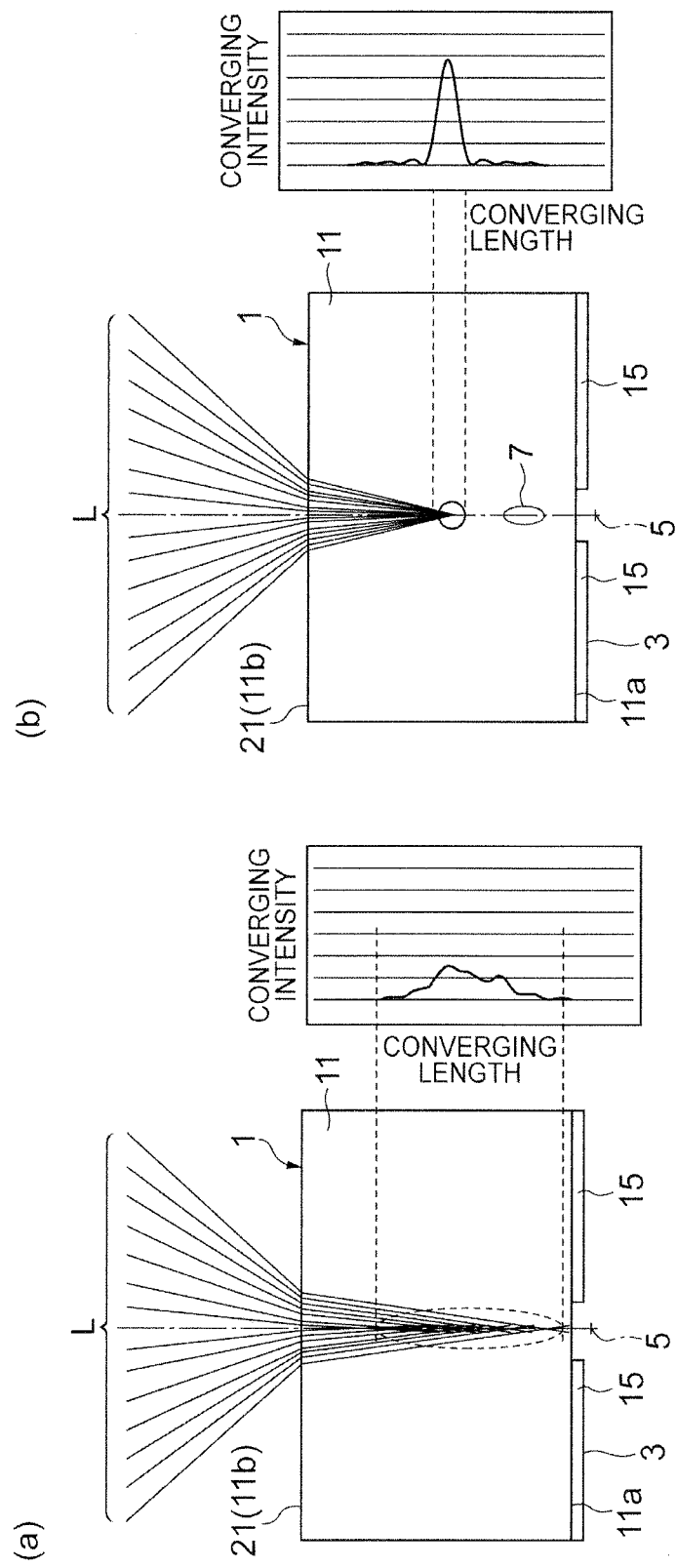
FIG. 20 is a diagram illustrating each step of the laser processing method in the embodiment of the present invention.

From the above, the laser processing method performed in the laser processing device 300, first, as illustrated in FIG. 20(*a*), adjusts the aberration such that the first converging length longer than the reference converging length of the reference aberration is obtained and the first converging intensity less than the reference converging intensity of the reference aberration is obtained, and converges the laser light L at the object 1 so as to form the modified region 7 within the first region closest to the front face 3 as the opposite side to the laser light L entrance side of the object 1 (first step). Subsequently, as illustrated in FIG. 20(*b*), the laser processing method adjusts the aberration such that the second converging length shorter than the reference converging length of the reference aberration is obtained and the second converging intensity greater than the reference converging intensity of the reference aberration is obtained, and converges the laser light L at the object 1 so as to form the modified region 7 within the second region closer than the first region in the rear face 21 as the laser light L entrance side of the object 1 (second step).

Incidentally, the first region is set so that a fracture does not reach the front face 3 of the object 1, the fracture extending to the opposite side to the laser light L entrance side from the modified region 7 when the modified region 7 is formed within the first region. The second region is set so as not to overlap with a fracture extending to the laser light L entrance side from the modified region 7 when the modified region 7 is formed within the first region.

After that, the laser processing method sticks an expanding tape on the rear face 21 of the object 1, and expands the expanding tape. This causes fractures extending in the thickness direction of the object 1 from the modified region 7 formed along the line 5 to reach the front face 3 and rear face 21 of the object 1, and the laser processing method cuts the object 1 along the line 5 for each of the functional devices 15 to obtain the plurality of chips.

As described above, the laser processing device 300, and the laser processing method performed in the laser processing device 300, while using the aberration as the reference aberration, the aberration occurring at the converging position CP1 in the state in which the ideal converging position CP0 is shifted by the predetermined distance to the laser light L entrance side along the optical axis of the laser light L from the converging position CP1, adjust the aberration such that the first converging length longer than the reference converging length of the reference aberration is obtained and the first converging intensity less than the reference converging intensity of the reference aberration is obtained, and converge the laser light at the object 1 so as to form the modified region 7 within the first region closest to the front face 3 as the opposite side to the laser light L entrance side of the object 1. This can inhibit the damages D from occurring at the part deviated from the line 5 in the front face 3 as the opposite side to the laser light L entrance side of the object 1.

The laser processing device and method adjust the aberration such that the second converging length shorter than the reference converging length of the reference aberration is obtained and the second converging intensity greater than the reference converging intensity of the reference aberration is obtained, and converge the laser light at the object 1 so as to form the modified region 7 within the second region closer than the first region in the rear face 21 as the laser light L entrance side of the object 1. This causes the length of fractures to be increased, the fractures extending to the front face 3 side and the rear face 21 side from the modified region 7 formed within the second region, to shorten the time required for processing.

The front face 3 of the object 1 is provided with the plurality of functional devices 15 including the wiring 16, and the line S is set so as to pass through the street region 17 between the functional devices 15 adjacent to each other. This can inhibit the damages D from occurring at the wiring 16 included in the functional devices 15.

The first region, in which the laser processing device and method adjust the aberration such that the first converging length longer than the reference converging length of the reference aberration is obtained and the first converging intensity less than the reference converging intensity of the reference aberration is obtained, is set to a region in which the distance from the front face 3 of the object 1 is 60 μm or less. This can more reliably inhibit the damages D from occurring at the part deviated from the line 5 in the front face 3 of the object 1, and causes the fracture extending to the front face 3 side of the object 1 from the modified region 7 formed within the first region to reach the front face 3 of the object 1 along the line 5 accurately.

The second region, in which the laser processing device and method adjust the aberration such that the second converging length shorter than the reference converging length of the reference aberration is obtained and the second converging intensity greater than the reference converging intensity of the reference aberration is obtained, is set to a region in which the distance from the front face 3 of the object 1 is 40 μm or more. This can more reliably inhibit the damages D from occurring at the part deviated from the line 5 in the front face 3 of the object 1, and causes the length to be increased of the fractures extending to the front face 3 side and the rear face 21 side from the modified region 7 within the second region.

When the aberration is determined as the reference aberration, the aberration occurring when the laser light L is converged at the converging position CP1 with the amount of aberration correction in the state in which the ideal converging position CP0 is shifted by the predetermined distance to the laser light L entrance side along the optical axis of the laser light L from the converging position CP1, the predetermined distance is 110 μm or more and 140 μm or less. This can appropriately set the reference aberration.

The first region is set so that the fracture does not reach the front face 3 of the object 1, the fracture extending to the opposite side to the laser light L entrance side from the modified region 7 when the modified region 7 is formed within the first region. The second region is set so as not to overlap with the fracture extending to the laser light L entrance side from the modified region 7 when the modified region 7 is formed within the first region. From these, since the fracture already formed is inhibited from functioning as a mirror surface when the modified region 7 is formed within the second region, the damages D can be more reliably inhibited from occurring at the part deviated from the line 5 in the front face 3 of the object 1.

Figure 21:
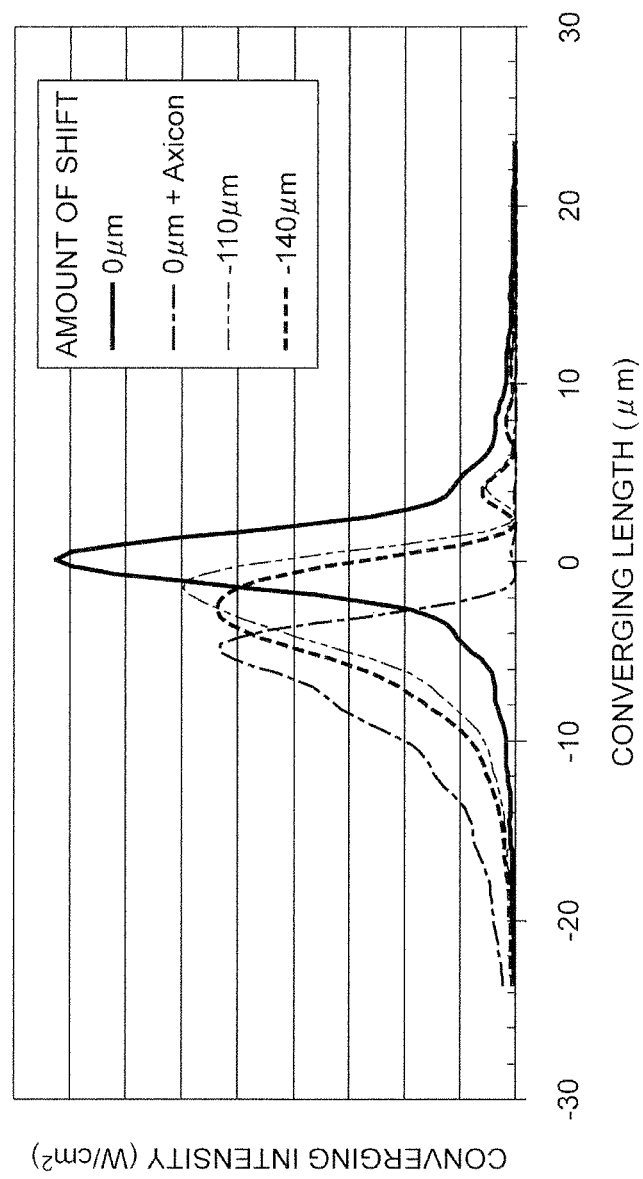
FIG. 21 is a diagram illustrating a relationship between the converging intensity and converging length of the laser light.

Incidentally, even when the liquid crystal layer 216 of the reflective spatial light modulator 203 is caused to display an axicon lens pattern as the modulation pattern to modulate the laser light L, as illustrated in FIG. 21, similarly to a case in which the amount of shift (that is, "the distance from the converging position to the ideal converging position" in the state in which the ideal converging position CP0 is shifted to the laser light L entrance side along the optical axis of the laser light L from the converging position CP1) is increased, the laser processing device and method can adjust the aberration such that the first converging length longer than the reference converging length of the reference aberration is obtained and the first converging intensity less than the reference converging intensity of the reference aberration is obtained.

Figure 22:
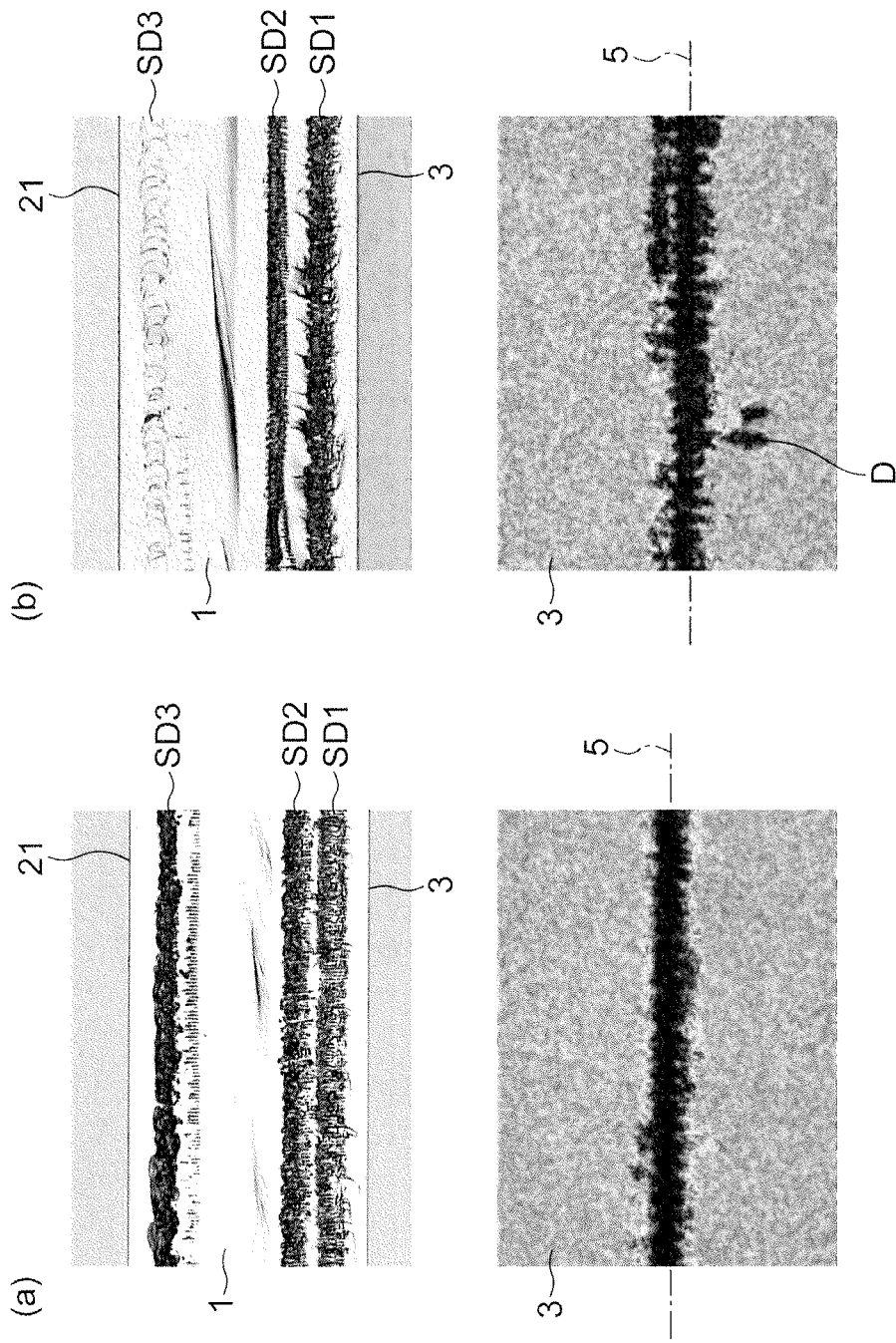
FIG. 22 is a diagram illustrating a contrast between a result of an example using a spherical aberration correction pattern and a result of a comparative example not using the spherical aberration correction pattern.

FIG. 22 is a diagram illustrating a contrast between a result of an example using a spherical aberration correction pattern and a result of a comparative example not using the spherical aberration correction pattern. The upper part of FIG. 22(a) is a cross-sectional photograph of the object 1 according to the example, and the lower part of FIG. 22(a) is a planar photograph of the object 1 according to the example. The upper part of FIG. 22(b) is a cross-sectional photograph of the object 1 according to the comparative example, and the lower part of FIG. 22(b) is a planar photograph of the object 1 according to the comparative example. Experimental conditions are as follows.

1. Object to be Processed
   (1) A silicon substrate of a thickness of 250 μm is prepared.
2. Laser Light Irradiation Conditions
   (1) The ideal converging position CP0 and the converging position CP1 of the laser light L are adjusted under the conditions indicated in Table 2 below, and the laser light L is emitted under the conditions of a wavelength of 1080 nm, repetition frequency of 92 kHz, pulse width of 500 ns, processing energy of 15 μJ, and scan speed of 345 mm/s. Incidentally, in Table 2, the "rear face" is the rear face 21 as the laser light L entrance side of the object 1. The "amount of shift" is a distance from the converging position to the ideal converging position, and with reference to the converging position CP1, when the ideal converging position CP0 is shifted to the laser light L entrance side, the amount of shift is represented by "−" value, and when the ideal converging position CP0 is shifted to the opposite side to the laser light L entrance side, the amount of shift is represented by "+" value.

TABLE 2

|  | Modified Region | Distance from Rear Face to Converging Position (μm) | Distance from Rear Face to Ideal Converging Position (μm) | Amount of Shift (μm) |
| --- | --- | --- | --- | --- |
| Example | SD3 | 70 | 70 | 0 |
|  | SD2 | 190 | 190 | 0 |
|  | SD1 | 230 | 58 | −172 |
| Comparative Example | SD3 | 70 | 70 | 0 |
|  | SD2 | 190 | 190 | 0 |
|  | SD1 | 230 | 230 | 0 |

As a result of this experiment, in the example using the spherical aberration correction pattern, as illustrated in the lower part of FIG. 22(a), the damages D do not occur at the part deviated from the line 5 in the front face 3 of the object 1. On the other hand, in the comparative example not using the spherical aberration correction pattern, as illustrated in the lower part of FIG. 22(b), the damages D occur at the part deviated from the line 5 in the front face 3 of the object 1.

Figure 23:
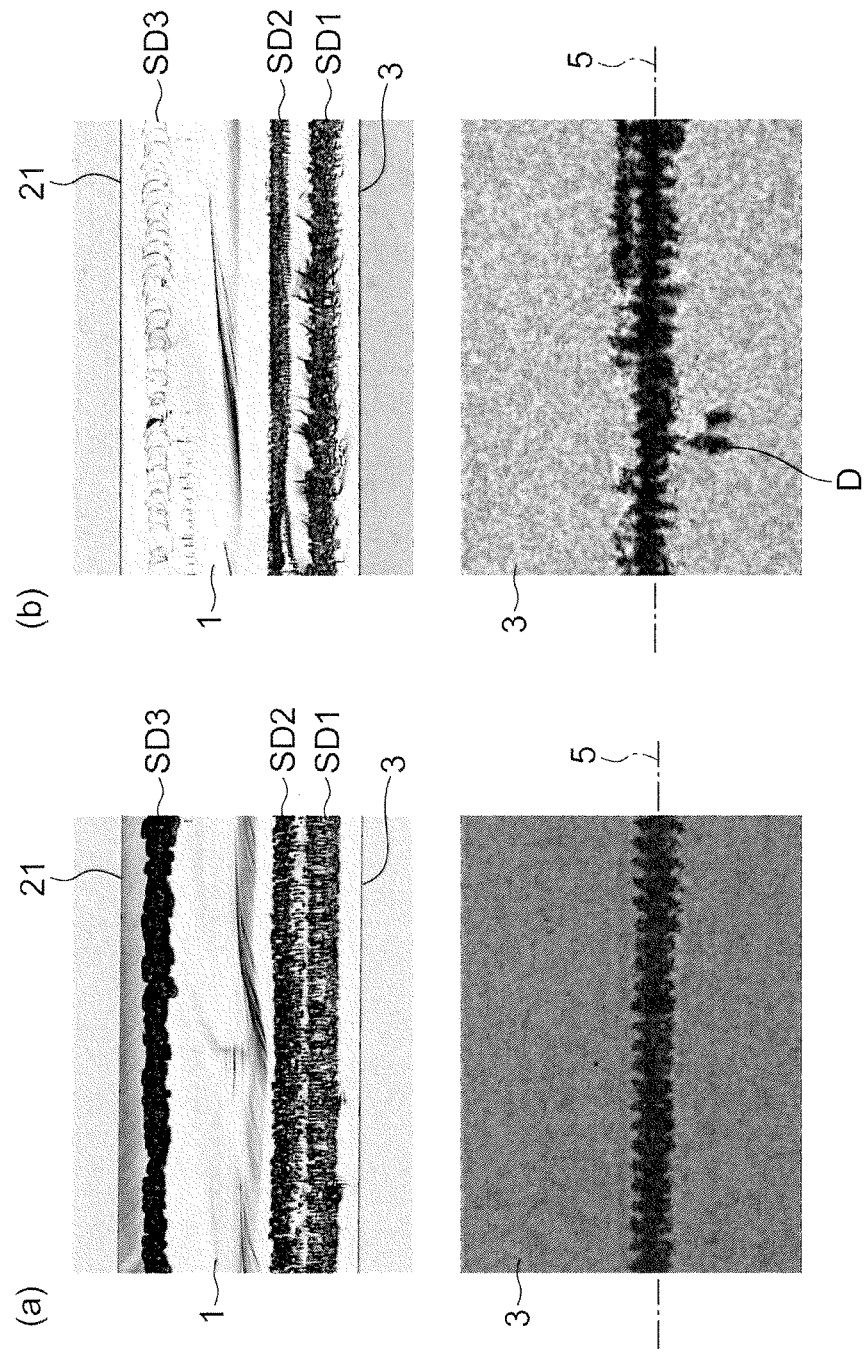
FIG. 23 is a diagram illustrating a contrast between a result of an example using an axicon lens pattern and a result of a comparative example not using the axicon lens pattern.

FIG. 23 is a diagram illustrating a contrast between a result of an example using an axicon lens pattern and a result of a comparative example not using the axicon lens pattern. The upper part of FIG. 23(a) is a cross-sectional photograph of the object 11 according to the example, and the lower part of FIG. 23(a) is a planar photograph of the object 1 according to the example. The upper part of FIG. 23(b) is a cross-sectional photograph of the object 1 according to the comparative example, and the lower part of FIG. 23(b) is a planar photograph of the object 1 according to the comparative example. Experimental conditions are as follows.

1. Object to be Processed
   (1) A silicon substrate of a thickness of 250 μm is prepared.
2. Laser Light Irradiation Conditions
   (1) The ideal converging position CP0 and the converging position CP1 of the laser light L are adjusted under the conditions indicated in Table 3 below, and the laser light L is emitted under the conditions of a wavelength of 1080 nm, repetition frequency of 92 kHz, pulse width of 500 ns, processing energy 15 μJ, and scan speed 345 mm/s. Incidentally, in Table 3, the "rear face" is the rear face 21 as the laser light L entrance side of the object 1. The "amount of shift" is a distance from the converging position to the ideal converging position.

TABLE 3

|  | Modified Region | Distance from Rear Face to Converging Position (μm) | Distance from Rear Face to Ideal Converging Position (μm) | Amount of Shift (μm) |
| --- | --- | --- | --- | --- |
| Example | SD3 | 70 | 70 | 0 |
|  | SD2 | 190 | 190 | 0 |
|  | SD1 | 230 | 230 | 0 * Provided that, an axicon lens pattern is used. |
| Comparative Example | SD3 | 70 | 70 | 0 |
|  | SD2 | 190 | 190 | 0 |
|  | SD1 | 230 | 230 | 0 |

As a result of this experiment, in the example using the axicon pattern, as illustrated in the lower part of FIG. 23(a), the damages D do not occur at the part deviated from the line 5 in the front face 3 of the object 1. On the other hand, in the comparative example not using the spherical aberration correction pattern, as illustrated in the lower part of FIG. 23(b), the damages D occur at the part deviated from the line 5 in the front face 3 of the object 1.

Figure 24:
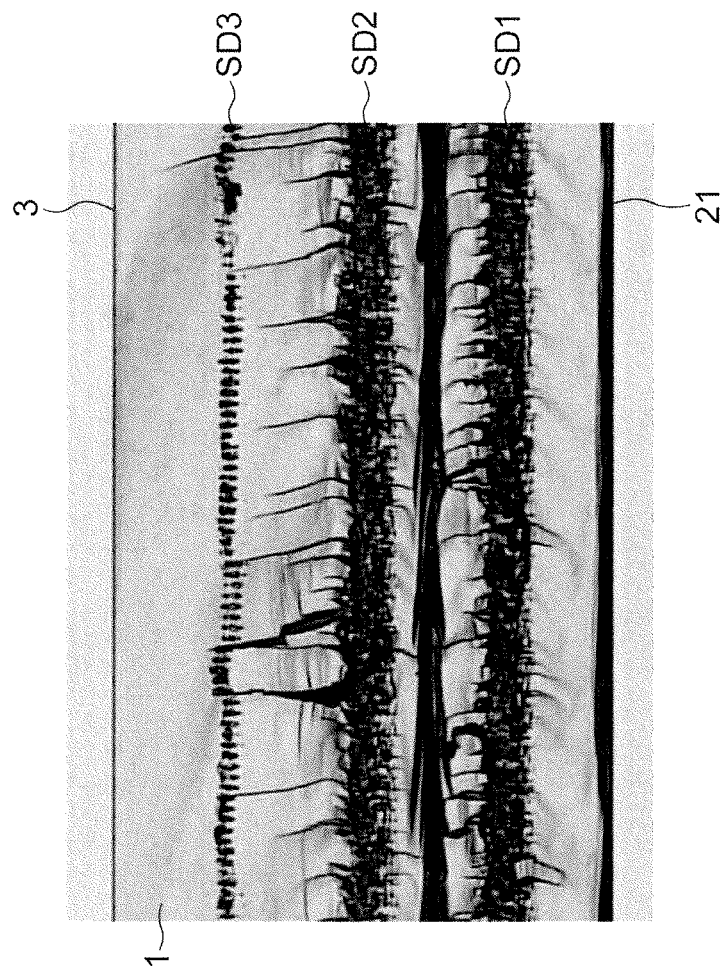
FIG. 24 is a diagram illustrating a result of a reference example adjusting processing energy.

FIG. 24 is a diagram illustrating a result of a reference example adjusting energy, and is a cross-sectional photograph of the object 1.

Experimental conditions are as follows.

1. Object to be Processed
   (1) A silicon substrate of a thickness of 300 μm is prepared.
2. Laser Light Irradiation Conditions
   (1) The ideal converging position CP0 and the converging position CP1 of the laser light L, and the processing energy are adjusted under the conditions indicated in Table 4 below, and the laser light L is emitted under the conditions of a wavelength of 1342 nm, repetition frequency of 60 kHz, pulse width of 60 ns, and scan speed of 340 mm/s. Incidentally, in Table 4, the "rear face" is the rear face 21 as the laser light L entrance side of the object 1. The "amount of shift" is a distance from the converging position to the ideal converging position.

TABLE 4

|  | Modified Region | Distance from Rear Face to Converging Position (μm) | Distance from Rear Face to Ideal Converging Position (μm) | Amount of Shift (μm) | Processing Energy (μJ) |
|---|---|---|---|---|---|
| Reference Example | SD3 | 100 | 100 | 0 | 10 |
|  | SD2 | 180 | 180 | 0 | 10 |
|  | SD1 | 260 | 260 | 0 | 10 |

As a result of this experiment, it can be said that the following matters are effective in order to inhibit the damages D from occurring at the part deviated from the line 5 in the front face 3 of the object 1.
(1) The processing energy for forming the modified region 7 within the first region (first region closest to the front face 3 as the opposite side to the laser light L entrance side of the object 1) is smaller than the processing energy for forming the modified region 7 within the second region (second region closer than the first region in the rear face 21 as the laser light L entrance side of the object 1).
(2) The processing energy for forming the modified region 7 within the first region is 10 μm or less.
(3) A black line is formed between the modified region 7 formed within the first region and the modified region 7 formed within the second region (see FIG. 24).
(4) The modified region 7 formed within the first region and the modified region 7 formed in the second region are separated by 60 μm or more.
(5) When the modified region 7 is formed within the first region, the fracture extending from the modified region 7 does not reach the front face 3 of the object 1, and, when the modified region 7 is formed within the second region, the fracture reaches the front face 3 of the object 1.

Figure 25:
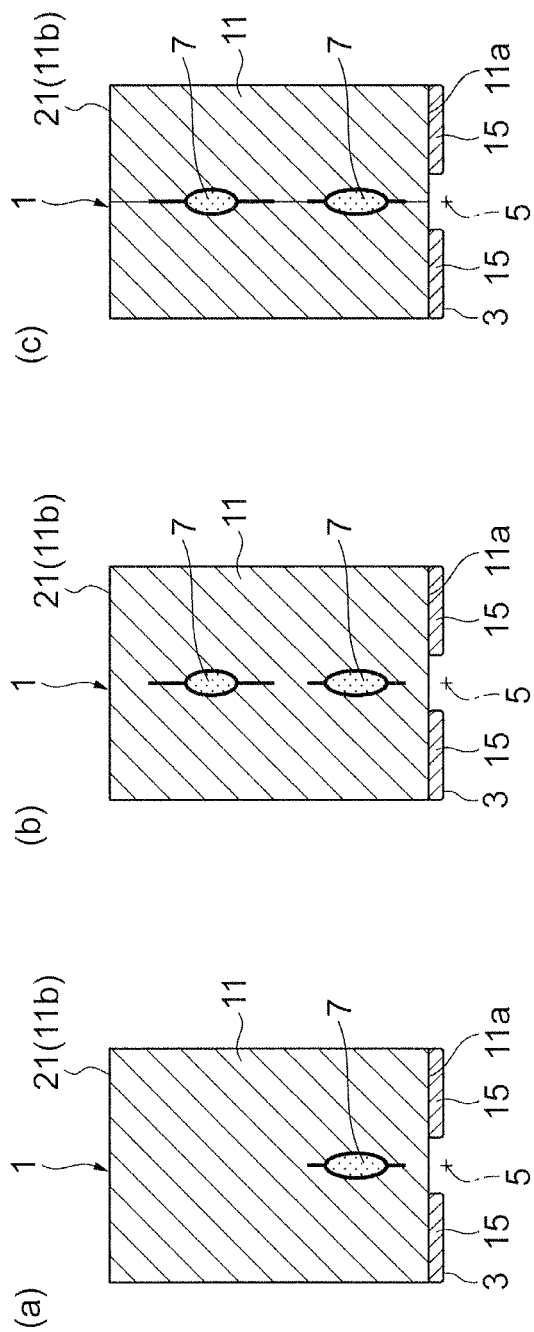
FIG. 25 is a diagram illustrating formation order of the modified region.

Finally, sequence of forming the modified region 7 will be explained. The laser processing device and method may form the modified region 7 within the first region along the line 5 as illustrated in FIG. 25(a), and then form the modified region 7 in the second region along the line 5 as illustrated in FIG. 25(b), and then expand the expanding tape stuck on the rear face 21 of the object 1 so as to cause the fractures extending in the thickness direction of the object 1 from the modified regions 7 formed along the line 5 to reach the front face 3 and rear face 21 of the object 1 as illustrated in FIG. 25(c). In this case, at the time of forming the modified region 7 within the second region, the fracture extending from the modified region formed within the first region and the fracture extending from the modified region formed from the second region are not connected to each other. Incidentally, the fractures extending in the thickness direction of the object 1 from the modified region 7 may reach the front face 3 and rear face 21 of the object 1 during forming the modified region 7 within the second region and before expanding the expanding tape.

Figure 26:
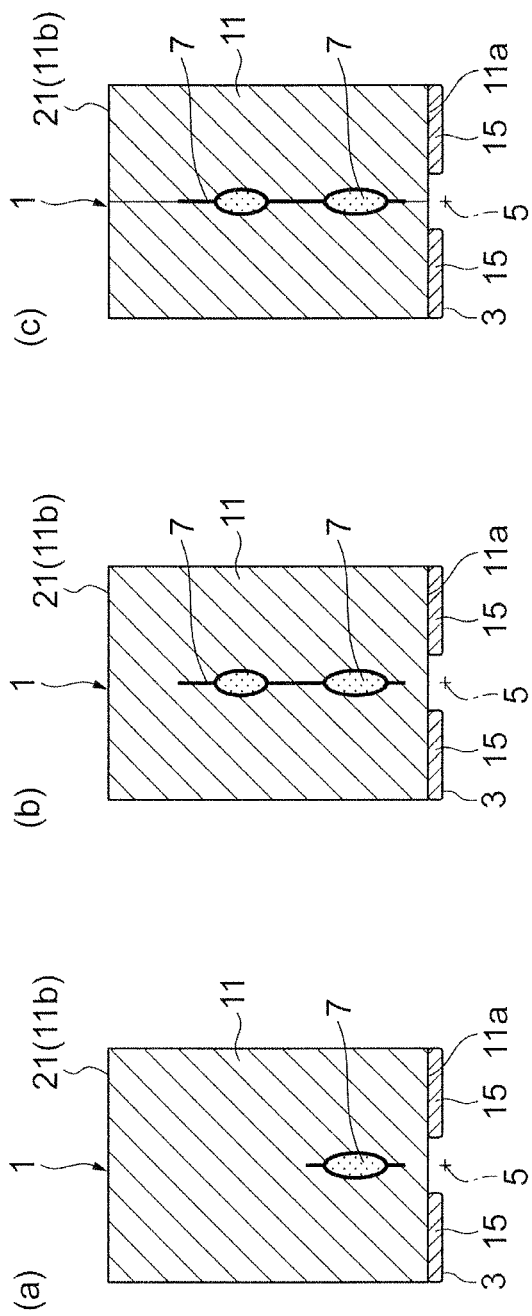
FIG. 26 is a diagram illustrating the formation order of the modified region.

The laser processing device and method may form the modified region 7 within the first region along the line 5 as illustrated in FIG. 26(a), and then form the modified region 7 within the second region along the line 5 as illustrated in FIG. 26(b), and then expand the expanding tape stuck on the rear face 21 of the object 1 so as to cause the fractures extending in the thickness direction of the object 1 from the modified regions 7 formed along the line 5 to reach the front face 3 and rear face 21 of the object 1 as illustrated in FIG. 26(c). In this case, at the time of forming the modified region 7 within the second region, the fracture extending from the modified region formed within the first region and the fracture extending from the modified region formed within the second region are connected to each other. Incidentally, the fractures extending in the thickness direction of the object 1 from the modified region 7 may reach the front face 3 and rear face 21 of the object 1 during forming the modified region 7 within the second region and before expanding the expanding tape.

The laser processing device and method may divide and converge the laser light L simultaneously at the first region and second region, by using the reflective spatial light modulator 203 so as to form the modified regions 7 simultaneously within the first region and second region along the line 5 as illustrated in FIG. 27(a), and then expand the expanding tape stuck on the rear face 21 of the object 1 so as to cause the fractures extending in the thickness direction of the object 1 from the modified regions 7 formed along the line 5 to reach the front face 3 and rear face 21 of the object 1 as illustrated in FIG. 27(b). In this case, at the time of forming the modified regions 7 within the first region and second region, the fracture extending from the modified region formed within the first region and the fracture extending from the modified region formed from the second region are not connected to each other. Incidentally, the fractures extending in the thickness direction of the object 1 from the modified region 7 may reach the front face 3 and rear face 21 of the object 1 during forming the modified region 7 within the first region and second region and before expanding the expanding tape.

The laser processing device and method may divide and converge the laser light L simultaneously at the first region and second region, by using the reflective spatial light modulator 203 so as to form the modified regions 7 simultaneously within the first region and second region along the line 5 as illustrated in FIG. 28(a), and then expand the expanding tape stuck on the rear face 21 of the object 1 so as to cause the fractures extending in the thickness direction of the object 1 from the modified regions 7 formed along the line 5 to reach the front face 3 and rear face 21 of the object 1 as illustrated in FIG. 28(b). In this case, at the time of forming the modified regions 7 within the first region and second region, the fracture extending from the modified region formed within the first region and the fracture extending from the modified region formed within the second region are connected to each other. Incidentally, the fractures extending in the thickness direction of the object 1 from the modified region 7 may reach the front face 3 and rear face 21 of the object 1 during forming the modified region 7 within the first region and second region and before expanding the expanding tape.

The embodiment of the present invention has been described above; however, the present invention is not limited to the above-mentioned embodiment. For example, even when forming one row of the modified region 7 for one line of the line 5, when forming the modified region 7 within the first region in which the distance from the front face 3 as the opposite side to the laser light L entrance side of the object is a predetermined distance or less, if the laser processing device and method adjust the aberration such that the first converging length longer than the reference converging length of the reference aberration is obtained and the first converging intensity less than the reference converging intensity of the reference aberration is obtained, the damages D can be inhibited from occurring at the part deviated from the line 5 in the front face 3 of the object 1.

The structure and material of the object 1 are not limited to those mentioned above. As an example, the substrate 11 may be a semiconductor substrate other than the silicon substrate, sapphire substrate, SiC substrate, glass substrate (tempered glass substrate), transparent insulation substrate, or the like.

INDUSTRIAL APPLICABILITY

According to the present invention, the laser processing device and laser processing method can be provided capable of inhibiting the damages from occurring at the part deviated from the line in the surface as the opposite side to the laser light entrance side of the object.

REFERENCE SIGNS LIST 1 object to be processed
3 front face (first surface)
5 line to cut
7 modified region
15 functional device
16 wiring
17 street region (region)
21 rear face (second surface)
202 laser light source
203 reflective spatial light modulator (aberration modulator)
204 converging optical system
250 controller (aberration modulator)
300 laser processing device
L laser light
CP1 converging position
CP0 ideal converging position

The invention claimed is:

1. A laser processing device for converging laser light at an object to be processed so as to form a modified region within the object along a line to cut, the laser processing device comprising:
    a laser light source emitting the laser light;
    a converging optical system converging the laser light emitted from the laser light source at the object; and
    an aberration modulator adjusting an aberration caused by converging the laser light at the object and occurring at a converging position, wherein
    the aberration modulator is configured to,
    while using the aberration as a reference aberration, the aberration occurring when the laser light is converged at the converging position with an amount of aberration correction in a state in which an ideal converging position is shifted by a predetermined distance to a laser light entrance side along an optical axis of the laser light from the converging position,
        adjust the aberration such that a first converging length longer than a reference converging length of the reference aberration is obtained and a first converging intensity less than a reference converging intensity of the reference aberration is obtained, when the modified region is formed within a first region closest to a first surface as an opposite side to the laser light entrance side of the object, and
        adjust the aberration such that a second converging length shorter than the reference converging length is obtained and a second converging intensity greater than the reference converging intensity is obtained, when the modified region is formed within a second region closer than the first region in a second surface as the laser light entrance side of the object,
    wherein adjusting the aberration inhibits damages from occurring at a part deviated from the line in the first surface as the opposite side to the laser light entrance side of the object.

2. The laser processing device according to claim 1, wherein
    the first surface is provided with a plurality of functional devices including wiring, and the line is set so as to pass through a region between functional devices of the plurality of functional devices that are adjacent to each other.

3. The laser processing device according to claim 1, wherein
    the first region is set to a region in which a distance from the first surface is 60 μm or less.

4. The laser processing device according to claim 1, wherein
    the second region is set to a region in which a distance from the first surface is 40 μm or more.

5. The laser processing device according to claim 1, wherein
    the predetermined distance is 110 μm or more and 140 μm or less.

6. A laser processing method for converging laser light at an object to be processed so as to form a modified region within the object along a line to cut, the method comprising:
    a first step of adjusting an aberration caused by converging the laser light at the object and occurring at a converging position and converging the laser light at the object so as to form the modified region within a first region closest to a first surface as an opposite side to a laser light entrance side of the object; and
    a second step of adjusting the aberration occurring at the converging position and converging the laser light at the object so as to form the modified region within a second region closer than the first region in a second surface as the laser light entrance side of the object, wherein,
    the first step adjusts the aberration such that a first converging length longer than a reference converging length of a reference aberration is obtained, the reference aberration occurring when the laser light is converged at the converging position with an amount of aberration correction in a state in which an ideal converging position is shifted by a predetermined distance to the laser light entrance side along an optical axis of the laser light from the converging position, and a first converging intensity less than a reference converging intensity of the reference aberration is obtained, and
    the second step adjusts the aberration such that a second converging length shorter than the reference converging length is obtained and a second converging intensity greater than the reference converging intensity is obtained,
    wherein adjusting the aberration inhibits damages from occurring at a part deviated from the line in the first surface as the opposite side to the laser light entrance side of the object.

7. The laser processing method according to claim 6, wherein
    the first surface is provided with a plurality of functional devices including wiring, and the line is set so as to pass through a region between the functional devices adjacent to each other.

8. The laser processing method according to claim 6, wherein
   the first region is set to a region in which a distance from the first surface is 60 μm or less.

9. The laser processing method according to claim 6, wherein
   the second region is set to a region in which a distance from the first surface is 40 μm or more.

10. The laser processing method according to claim 6, wherein
    the predetermined distance is 110 μm or more and 140 μm or less.

11. The laser processing method according to claim 6, wherein,
    the first region is set such that a fracture extending to an opposite side to the laser light entrance side does not reach the first surface from the modified region in the first step, when the second step is performed after the first step is performed.

12. The laser processing method according to claim 6, wherein,
    the second region is set so as not to overlap with a fracture extending to the laser light entrance side from the modified region in the first step, when the second step is performed after the first step is performed.

* * * * *